(12) United States Patent
Wu

(10) Patent No.: US 11,377,132 B2
(45) Date of Patent: Jul. 5, 2022

(54) CHILD STROLLER APPARATUS

(71) Applicant: Wonderland Switzerland AG, Steinhausen (CH)

(72) Inventor: Haitao Wu, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 17/029,189

(22) Filed: Sep. 23, 2020

(65) Prior Publication Data

US 2021/0094601 A1 Apr. 1, 2021

(30) Foreign Application Priority Data

Sep. 26, 2019 (CN) .......................... 201910922678.8

(51) Int. Cl.
*B62B 7/06* (2006.01)
(52) U.S. Cl.
CPC ............ *B62B 7/06* (2013.01); *B62B 2205/20* (2013.01)
(58) Field of Classification Search
CPC .. B62B 7/06; B62B 7/062; B62B 7/08; B62B 2205/20
See application file for complete search history.

(56) References Cited

U.S. PATENT DOCUMENTS 7,278,652 B2 * 10/2007 Riedl ........................ B62B 7/08
280/47.38
8,602,442 B2 * 12/2013 Li ............................. B62B 7/08
280/647
8,672,341 B2 * 3/2014 Offord .................... B62B 7/062
280/47.38

(Continued)

FOREIGN PATENT DOCUMENTS

CN 201800747 U 4/2011
CN 105383539 A 3/2016

(Continued)

OTHER PUBLICATIONS

International Search Report of the corresponding PCT Application No. PCT/EP2020/076776.

(Continued)

*Primary Examiner* — John D Walters
(74) *Attorney, Agent, or Firm* — NZ Carr Law Office PLLC

(57) ABSTRACT

A child stroller apparatus includes a standing frame, a handle frame pivotally coupled to the standing frame and having a first coupling part, a front guard having a second coupling part pivotally connected with the first coupling part, and a locking mechanism including a front guard latch. The handle frame is rotatable for folding and unfolding the child stroller apparatus. The front guard is positionable in a deployed configuration while the child stroller apparatus is in an unfolded state. The front guard latch is movable between a locking position where it is engaged with the first and second coupling parts so that the front guard is locked to the handle frame in the deployed configuration, and an unlocking position where the front guard latch is disengaged from one of the first and second coupling parts for rotation of the front guard relative to the handle frame and the standing frame.

29 Claims, 20 Drawing Sheets

(56) References Cited

U.S. PATENT DOCUMENTS

| | | | | |
|---|---|---|---|---|
| 8,714,581 | B2* | 5/2014 | Fritz | B62B 7/062 |
| | | | | 280/643 |
| 9,050,993 | B2 | 6/2015 | Pollack | |
| 10,399,589 | B2* | 9/2019 | Horst | B62B 7/044 |
| 10,479,389 | B2* | 11/2019 | Zhong | F16B 12/06 |
| 10,501,106 | B2* | 12/2019 | Yuan | B62B 7/062 |
| 2011/0291389 | A1 | 12/2011 | Offord | |
| 2013/0140797 | A1 | 6/2013 | Fritz et al. | |
| 2016/0059876 | A1 | 3/2016 | Strauss | |
| 2017/0297599 | A1 | 10/2017 | Zhong | |
| 2017/0313337 | A1 | 11/2017 | Horst | |
| 2018/0327015 | A1 | 11/2018 | Yuan | |

FOREIGN PATENT DOCUMENTS

| | | | |
|---|---|---|---|
| CN | 107284506 | A | 10/2017 |
| GB | 2508250 | A | 5/2014 |
| TW | 201429773 | A | 8/2014 |
| WO | 2005108182 | A2 | 11/2005 |

OTHER PUBLICATIONS

Office Action of the corresponding Taiwan Patent Application No. 109133139 (with English translation) dated Jun. 4, 2021.

\* cited by examiner

CHILD STROLLER APPARATUS

CROSS-REFERENCE TO RELATED APPLICATION(S)

This application claims priority to China patent application no. 201910922678.8 filed on Sep. 26, 2019.

BACKGROUND

1. Field of the Invention

The present invention relates to child stroller apparatuses.

2. Description of the Related Art

A child stroller apparatus generally includes a stroller frame, a seat and a front guard. The front guard can extend in front of a child sitting on the seat to prevent falling of the child. The front guard may also include a tray for placement of various objects such as drinking containers, plates and the like. Conventionally, the front guard can be attached to the stroller frame for use, and detached from the stroller frame for facilitating its folding to a compact size. As it requires detaching and storing the front guard separately, this construction is not convenient in use.

Therefore, there is a need for a child stroller apparatus that is easy to operate and address at least the foregoing issues.

SUMMARY

The present application describes a child stroller apparatus that is easy to operate, and can fold into a compact form.

According to an embodiment, the child stroller apparatus includes a standing frame, a handle frame, a front guard and a locking mechanism. The handle frame is pivotally coupled to the standing frame and has a first coupling part, the handle frame being rotatable relative to the standing frame for folding and unfolding the child stroller apparatus. The front guard has a second coupling part pivotally connected with the first coupling part, the front guard being positionable in a deployed configuration while the child stroller apparatus is in an unfolded state. The locking mechanism includes a front guard latch disposed adjacent to the first and second coupling parts, the front guard latch being movable between a locking position where the front guard latch is engaged with the first and second coupling parts so that the front guard is locked to the handle frame in the deployed configuration, and an unlocking position where the front guard latch is disengaged from one of the first and second coupling parts for rotation of the front guard relative to the handle frame and the standing frame.

According to an embodiment, the second coupling part is pivotally connected with the first coupling part about a pivot axis, and the front guard latch is slidable along the pivot axis between the locking position and the unlocking position.

According to an embodiment, the locking mechanism further includes a spring connected with the front guard latch, the spring biasing the front guard latch toward the locking position.

According to an embodiment, the standing frame includes a leg frame having a third coupling part, the first coupling part being pivotally connected with the second coupling part at a first side and pivotally connected with the third coupling part at a second side opposite to the first side, whereby the handle frame, the front guard and the leg frame are rotatable relative to one another for folding and unfolding the child stroller apparatus.

According to an embodiment, the child stroller apparatus further includes a release actuator operable to cause the front guard latch to move from the locking position to the unlocking position.

According to an embodiment, the release actuator is operable to contact and urge the front guard latch to move from the locking position to the unlocking position as the handle frame rotates relative to the standing frame in a direction for folding the child stroller apparatus.

According to an embodiment, the standing frame includes a leg frame having a third coupling part that is pivotally connected with the first coupling part at a side opposite to that of the second coupling part, and the release actuator is connected with the third coupling part.

According to an embodiment, the release actuator extends through the first coupling part, and the standing frame includes a leg frame having a third coupling part that is pivotally connected with the first coupling part at a side opposite to that of the second coupling part, the third coupling part urging the release actuator to move relative to the first coupling part and push the front guard latch to move from the locking position to the unlocking position as the handle frame rotates in the direction for folding the child stroller apparatus.

According to an embodiment, the release actuator is slidably connected with the first coupling part, the release actuator being urged in movement relative to the first coupling part for causing the front guard latch to move from the locking position to the unlocking position via a sliding contact between the release actuator and the third coupling part.

According to an embodiment, the first coupling part is pivotally connected with the third coupling part about a pivot axis, and the release actuator has a protruding portion radially distant from the pivot axis that is slidably connected with the first coupling part, whereby the release actuator is rotatable along with the first coupling part about the pivot axis and is slidable relative to the first coupling part along the pivot axis.

According to an embodiment, the release actuator is urged in movement relative to the first coupling part for causing the front guard latch to move from the locking position to the unlocking position via a sliding contact between the protruding portion of the release actuator and the third coupling part.

According to an embodiment, the release actuator is connected with the second coupling part, and is movable to contact and urge the front guard latch to move from the locking position to the unlocking position. According to an embodiment, the release actuator is pivotally connected with the second coupling part, the release actuator having an actuation portion disposed inside a cavity between the first and second coupling part and a pulling portion extending outward, the pulling portion being pullable to cause the release actuator to rotate for contacting and urging the front guard latch to move from the locking position to the unlocking position.

According to an embodiment, the child stroller apparatus further includes a frame latch disposed adjacent to the first and third coupling parts, the frame latch being movable between a locking state where the frame latch is engaged with the first and third coupling parts for locking the child stroller apparatus in the unfolded state, and an unlocking state where the frame latch is disengaged from one of the first and third coupling parts for rotation of the handle frame relative to the leg frame, the frame latch and the front guard latch being linked in movement.

According to an embodiment, the second coupling part and the third coupling part are respectively connected pivotally with the first coupling part about a same pivot axis, the front guard latch and the frame latch being slidable along the pivot axis in contact with each other.

According to an embodiment, the child stroller apparatus further includes a spring configured to apply a biasing force that urges the frame latch and the front guard latch to move concurrently in a locking direction for rotationally locking the handle frame and the front guard.

According to an embodiment, the child stroller apparatus further includes a release actuator operable to cause the front guard latch and the frame latch to move concurrently in an unlocking direction.

According to an embodiment, the release actuator is carried with the second coupling part and is movable to contact and urge the front guard latch to move from the locking position to the unlocking position, the movement of the front guard latch toward the unlocking position causing the front guard latch to contact and urge the frame latch to move from the locking state to the unlocking state.

According to an embodiment, the release actuator is carried with the third coupling part and is operable to contact and push against the frame latch so that the frame latch and the front guard latch are urged in movement to respectively disengage from the third coupling part and the first coupling part.

According to an embodiment, the first coupling part is pivotally connected with the second coupling part and the third coupling part about a same pivot axis, the second coupling part includes a curved slot having a restraining portion, and the third coupling part is fixedly connected with a pin that is slidably connected with the curved slot, the restraining portion being configured to catch the pin for holding the front guard in a folded position relative to the leg frame.

According to an embodiment, the restraining portion of the curved slot has a curvature that is not centered on the pivot axis.

DETAILED DESCRIPTION OF THE EMBODIMENTS

Figure 1:
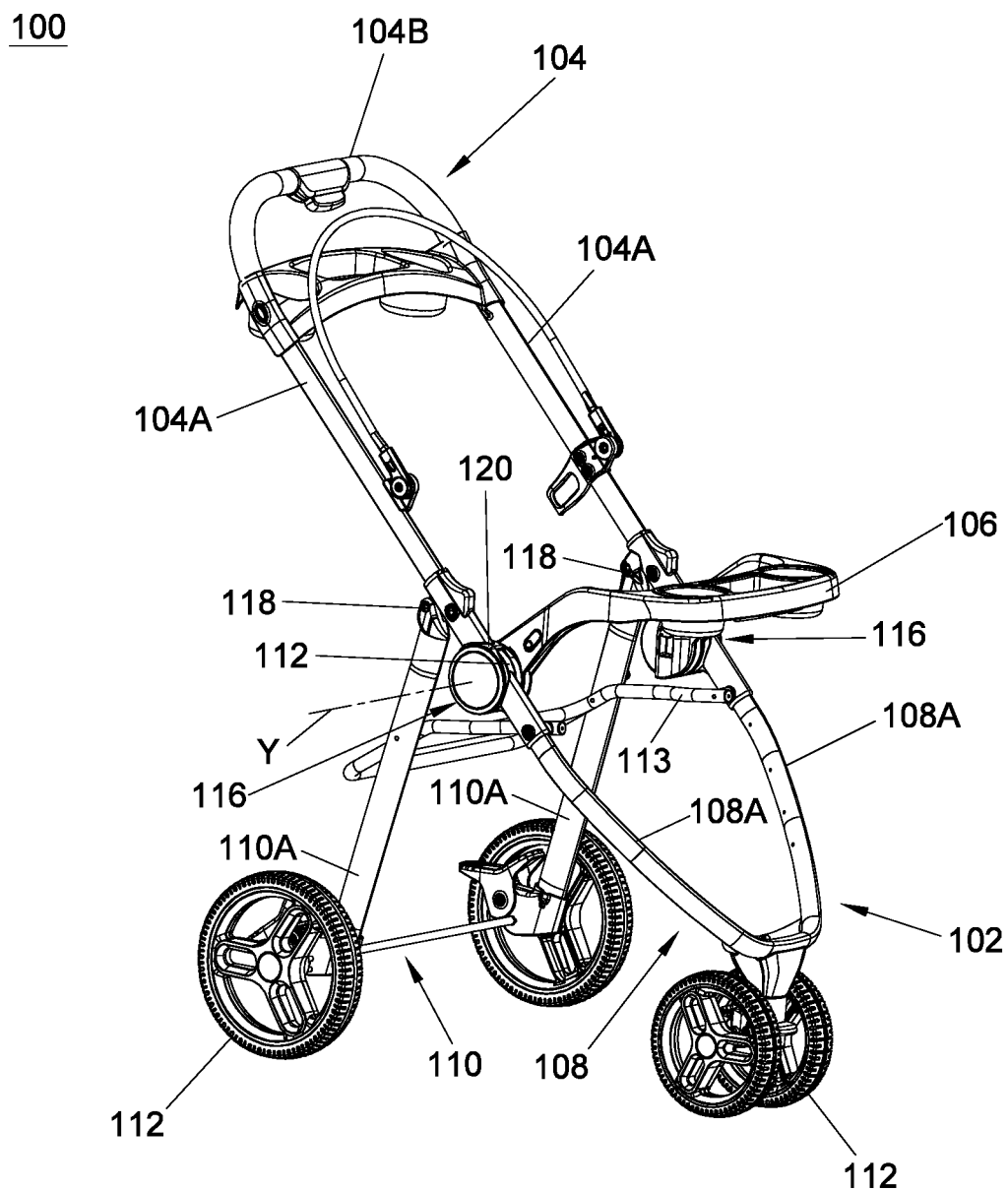
FIG. 1 is a perspective view illustrating an embodiment of a child stroller apparatus.

FIG. 1 is a perspective view illustrating an embodiment of a child stroller apparatus 100. Referring to FIG. 1, the child stroller apparatus 100 can include a standing frame 102, a handle frame 104 pivotally coupled to the standing frame 102, and a front guard 106 pivotally coupled to the handle frame 104.

The standing frame 102 can include two leg frames 108 and 110 respectively provided with a plurality of wheels 112, and a seat support frame 113 connected with the leg frames 108 and 110. For example, the leg frame 108 can be a front leg frame, and the leg frame 110 can be a rear leg frame. Each of the handle frame 104 and the leg frames 108 and 110 may have a generally symmetrical construction including two side segments respectively disposed at a left and a right side of the child stroller apparatus 100, e.g., two side segments 104A for the handle frame 104, two side segments 108A for the leg frame 108, and two side segments 110A for the leg frame 110. Moreover, the handle frame 104 can further include a grip portion 104B extending transversally that is respectively connected pivotally with the two side segments 104A. The side segments 104A, 108A, 110A and the grip portion 104B can include, for example, tube portions.

According to an example of construction, the handle frame 104 may be respectively connected pivotally with the two leg frames 108 and 110 about different pivot axes. For example, at each of the left and right side, the side segment 104A of the handle frame 104 and the side segment 108A of the leg frame 108 can be connected with each other via a joint structure 116, and the side segment 110A of the leg frame 110 can be pivotally connected with the side segment 104A of the handle frame 104 via a pivot connection 118. Accordingly, the handle frame 104 and the leg frames 108 and 110 can rotate relative to one another for folding and unfolding the child stroller apparatus 100.

Figure 2:
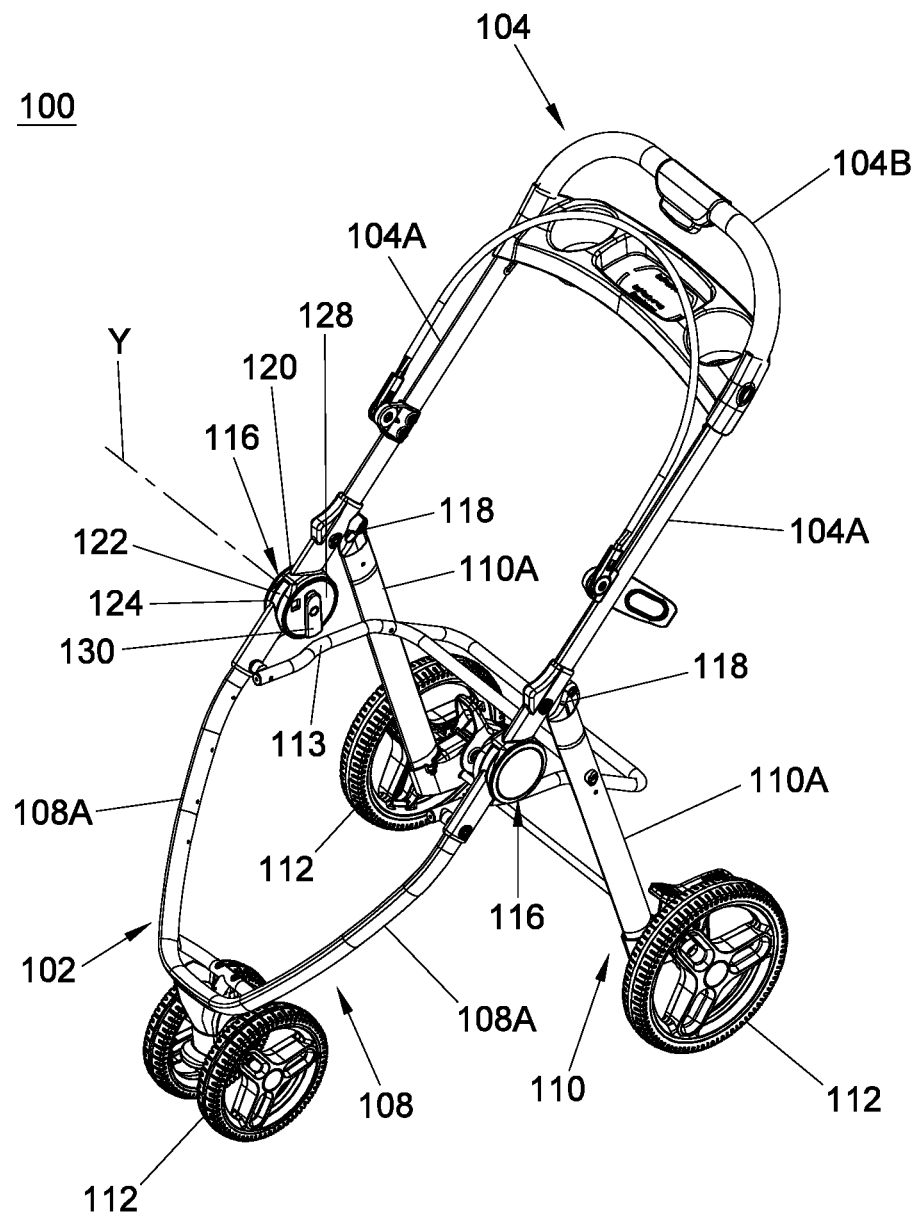
FIG. 2 is a perspective view illustrating the child stroller apparatus of FIG. 1 without a front guard.
Figure 3:
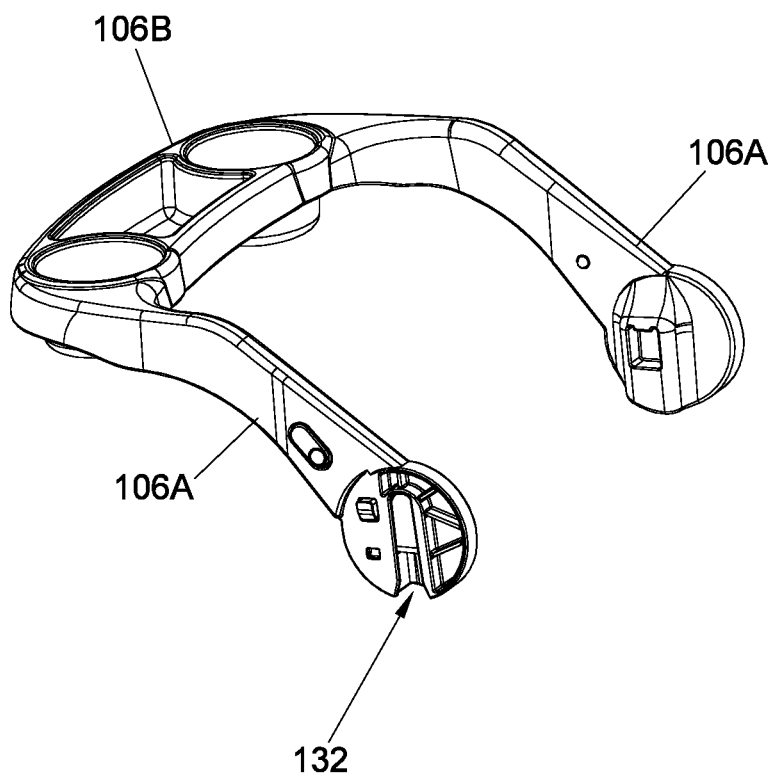
FIG. 3 is a perspective view illustrating the front guard of the child stroller apparatus alone.
Figure 4:
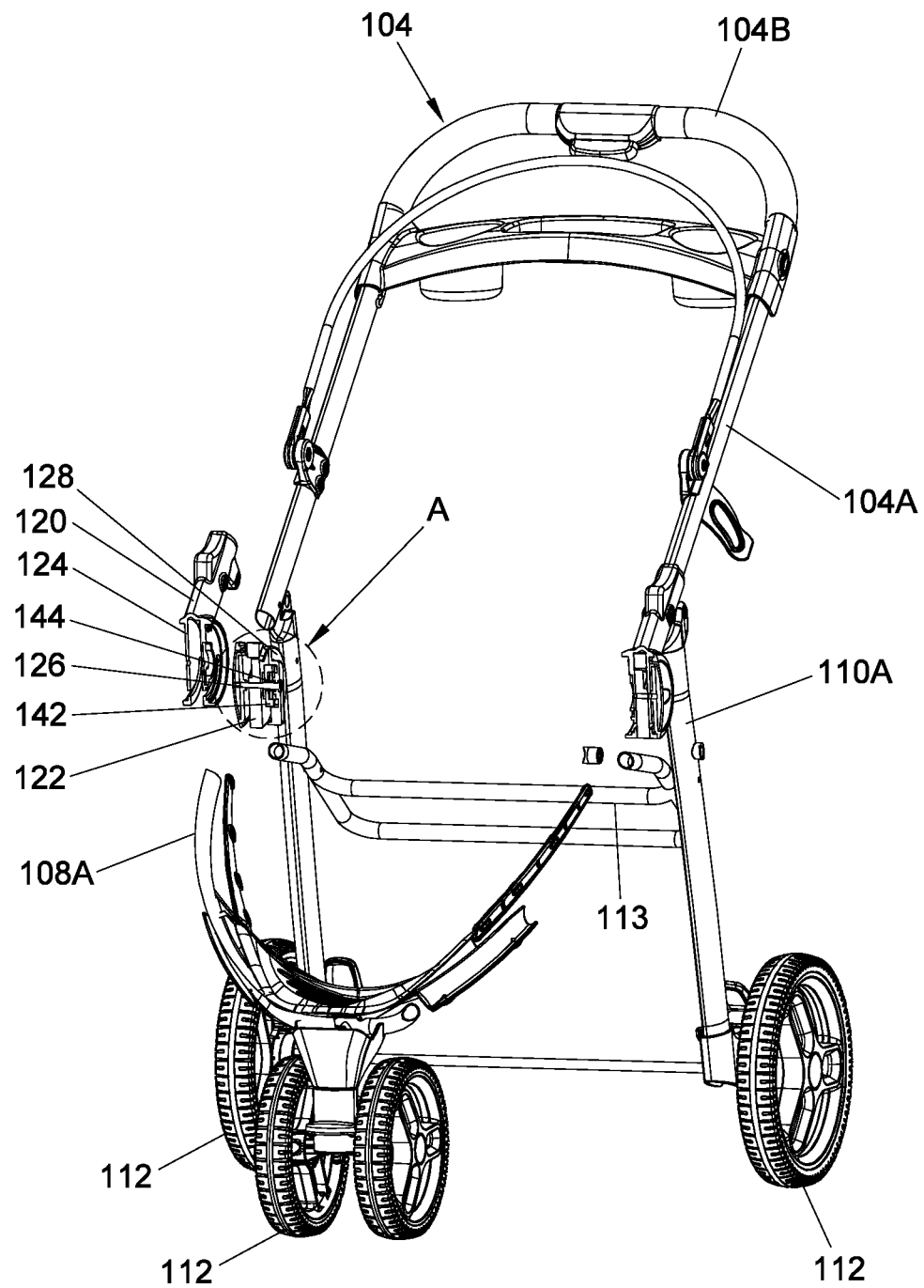
FIG. 4 is a partial cross-sectional view illustrating construction details related to the connection of the front guard with a handle frame in the child stroller apparatus.

In conjunction with FIG. 1, FIGS. 2-8 are schematic views illustrating further construction details of the child stroller apparatus 100, wherein FIG. 2 is a perspective view of the child stroller apparatus 100 without the front guard 106, FIG. 3 is a perspective view illustrating the front guard 106 alone, and FIGS. 4-8 are schematic views illustrating some construction details related to the connection of the front guard 106 with the handle frame 104. Referring to FIGS. 1, 4, 6 and 7, the joint structure 116 at each of the left and right side can be similar in construction. According to an example of construction, the joint structure 116 can include a coupling part 120 fixedly connected with the side segment 104A of the handle frame 104, and a coupling part 122 fixedly connected with the side segment 108A of the leg frame 108. The coupling part 120 can be pivotally connected with the coupling part 122 about a pivot axis Y, whereby the handle frame 104 can rotate about the pivot axis Y relative to the leg frame 108 for folding and unfolding the child stroller apparatus 100. According to an example of construction, the coupling part 120 can be formed to include a gap delimited between two parallel sidewalls 124 (better shown in FIG. 7), the coupling part 122 can be formed to include a plate disposed in the gap between the two sidewalls 124, and a shaft portion 126 (better shown in FIGS. 5 and 7) can pass through the sidewalls 124 of the coupling part 120 and the coupling part 122 for pivotally connecting the coupling parts 120 and 122. The side segment 110A of the leg frame 110 can be pivotally connected with the coupling part 120 away from the pivot axis Y. With this construction, the handle frame 104 can rotate relative to the leg frames 108 and 110 of the standing frame 102 for folding and unfolding the child stroller apparatus 100.

Referring to FIGS. 1-3, the front guard 106 can extend transversally across a width of the child stroller apparatus, and can include two side portions 106A connected with a transversal portion 106B. According to an example of construction, the front guard 106 comprised of the two side portions 106A and the transversal portion 106B can generally have a U-shape. The transversal portion 106B may exemplary include a tray on which various objects or items may be placed for use.

Referring to FIGS. 1-8, at each of the left and right side, the side portion 106A of the front guard 106 can be pivotally connected with the side segment 104A of the handle frame 104 adjacent to the joint structure 116. More specifically, each side portion 106A of the front guard 106 can have a coupling part 128 that is pivotally connected with the coupling part 120 affixed to the side segment 104A of the handle frame 104, wherein the coupling part 120 can be pivotally connected with the coupling part 128 at a first side and pivotally connected with the coupling part 122 at a second side opposite to the first side. The front guard 106 can thereby rotate at an inner side of the handle frame 104 between the two side segments 104A.

According to an example of construction, the coupling part 128 may be attached to the corresponding side portion 106A of the front guard 106 by engaging a mount portion 130 provided on the coupling part 128 with a slot 132 provided on the side portion 106A of the front guard 106. This attachment may facilitate the installation and detachment of the front guard 106.

According to an example of construction, the coupling part 128 of the front guard 106 and the coupling part 120 of the handle frame 104 can be pivotally connected with each other about the same pivot axis Y at each of the left and right side. For example, the coupling part 128 may be positioned adjacent to a receiving cavity 134A of the coupling part 120 with a peripheral edge 136 of the coupling part 128 abutting on an outer rim 134 of the coupling part 120 that surrounds the receiving cavity 134A. The shaft portion 126 can be disposed through a hole 128A provided in the coupling part 128, and can have an enlarged end 126A abutting on a rim of the hole 128A. The coupling part 128 can be thereby connected pivotally about the same shaft portion 126 that pivotally connects the coupling parts 120 and 122. In this manner, the handle frame 104, the front guard 106 and the leg frame 108 can rotate relative to one another about the pivot axis Y for folding and unfolding the child stroller apparatus 100. The rotational displacement of the front guard 106 relative to the handle frame 104 can be limited in at least one direction by the contact between a stop protrusion 138 provided on the coupling part 120 of the handle frame 104 and a stop protrusion 139 provided on the coupling part 128 of the front guard 106.

The front guard 106 and the coupling parts 128 attached thereto can be positioned in a deployed configuration while the child stroller apparatus 100 is in an unfolded state as shown in FIG. 1, and can rotate relative to the standing frame 102 and the handle frame 104 for facilitating folding of the child stroller apparatus 100 into a compact size. Moreover, the child stroller apparatus 100 can include a locking mechanism 140 for holding the front guard 106 in the deployed configuration. Two of the same locking mechanism 140 may be respectively provided at the left and right side adjacent to the connection of the front guard 106 with the handle frame 104.

Referring to FIGS. 4-8, the locking mechanism 140 can include a front guard latch 142 and a spring 144. The front guard latch 142 can be disposed adjacent to the coupling parts 120 and 128, and can move relative to the coupling parts 120 and 128 between a locking position and an unlocking position. In the locking position, the front guard latch 142 can be engaged with the coupling parts 120 and 128 so that the front guard 106 is locked to the handle frame 104 in the deployed configuration. In the unlocking position, the front guard latch 142 can be disengaged from one of the coupling parts 120 and 128 for rotation of the front guard 106 relative to the standing frame 102 and the handle frame 104.

According to an example of construction, the front guard latch 142 can be carried and connected with the coupling part 128 of the front guard 106, and can move between the locking position where the front guard latch 142 is engaged with the coupling parts 120 and 128 and the unlocking position where the front guard latch 142 is disengaged from the coupling part 120. For example, the front guard latch 142 can have a latching portion 146 that can engage or disengage a locking opening 148 provided in the coupling part 120 for rotationally locking or unlocking the front guard 106 with respect to the handle frame 104, and two eccentric protrusions 150 projecting from the latching portion 146 that can be respectively received at least partially in two openings 152 provided in the coupling part 128 for preventing rotation of the front guard latch 142 relative to the front guard 106. The front guard latch 142 including the latching portion 146 and the eccentric protrusions 150 may be formed integrally as a single part. The latching portion 146 can be engaged with the locking opening 148 in the locking position, and disengaged from the locking opening 148 in the unlocking position.

According to an example of construction, the front guard latch 142 can be disposed in a cavity delimited at least partially by the coupling parts 120 and 128, and can be mounted for sliding between the locking position and the unlocking position. For example, the front guard latch 142 can have an opening 154 through which is disposed the shaft portion 126, whereby the front guard latch 142 is slidably connected with the coupling part 128 and can slide along the pivot axis Y between the locking position and the unlocking position.

Figure 5:
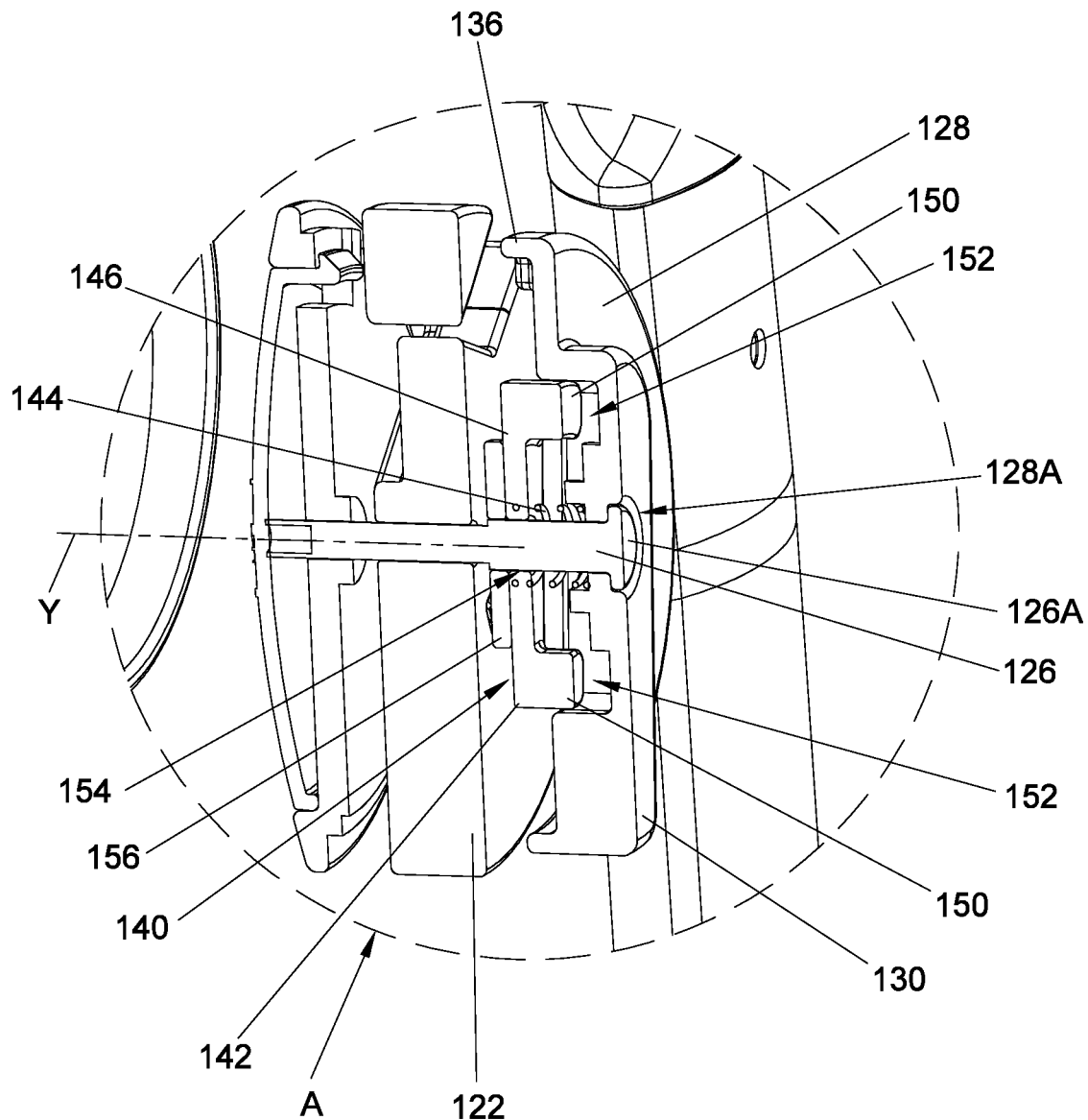
FIG. 5 is an enlarged view of portion A shown in FIG. 4.
Figure 6:
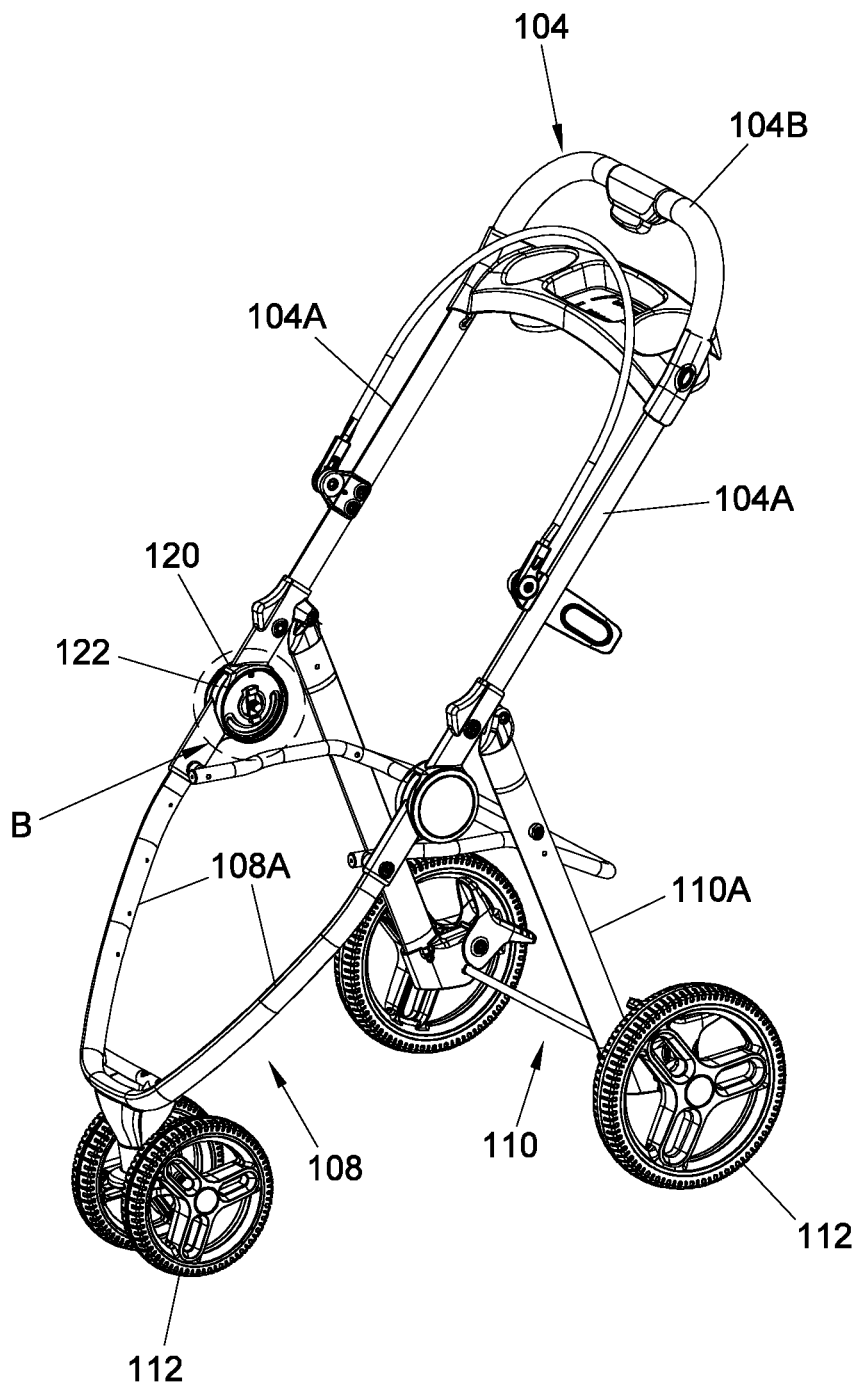
FIG. 6 is a perspective view illustrating some construction details of a locking mechanism for holding the front guard in a deployed configuration.
Figure 7:
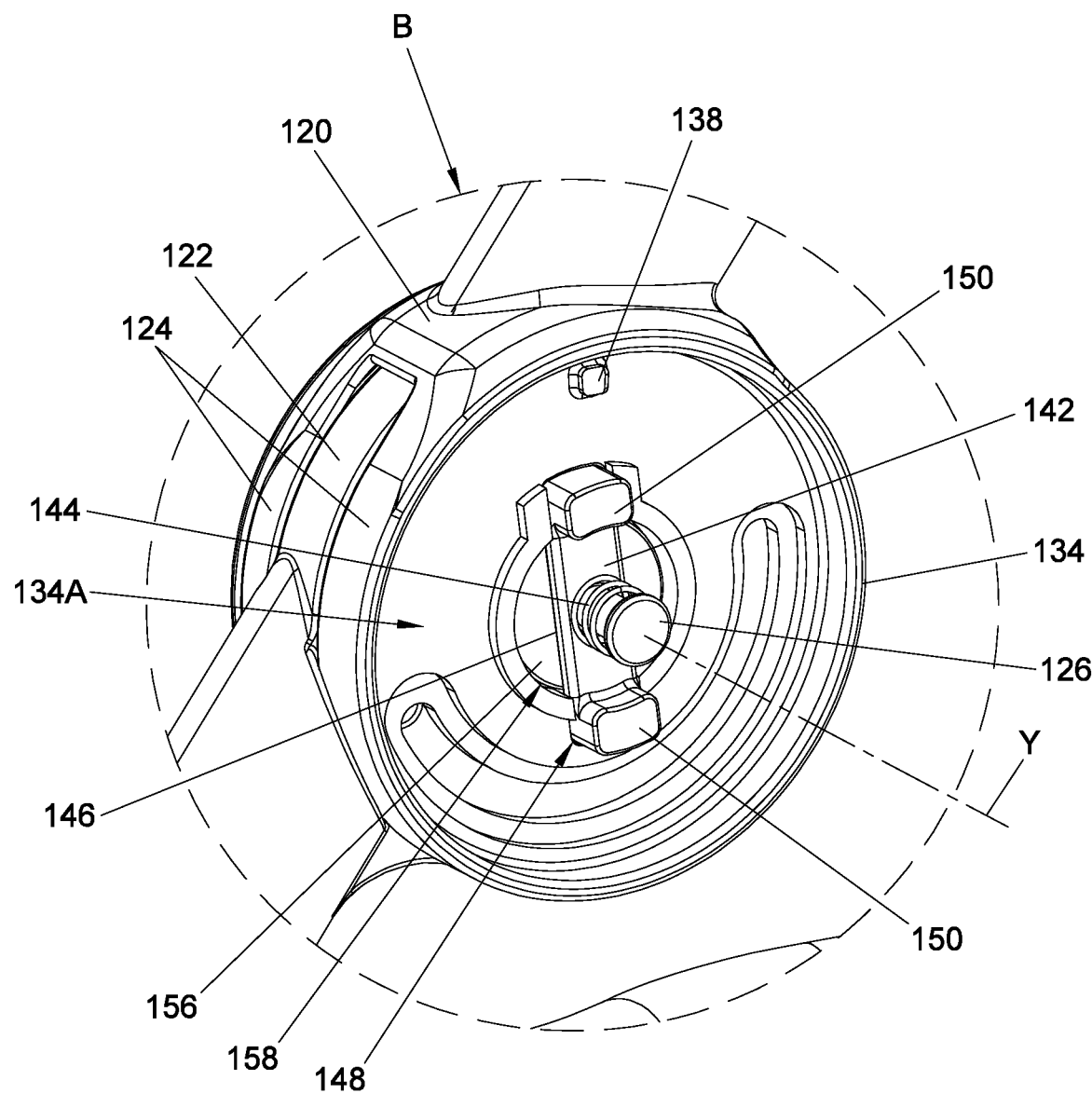
FIG. 7 is an enlarged view of portion B shown in FIG. 6.
Figure 8:
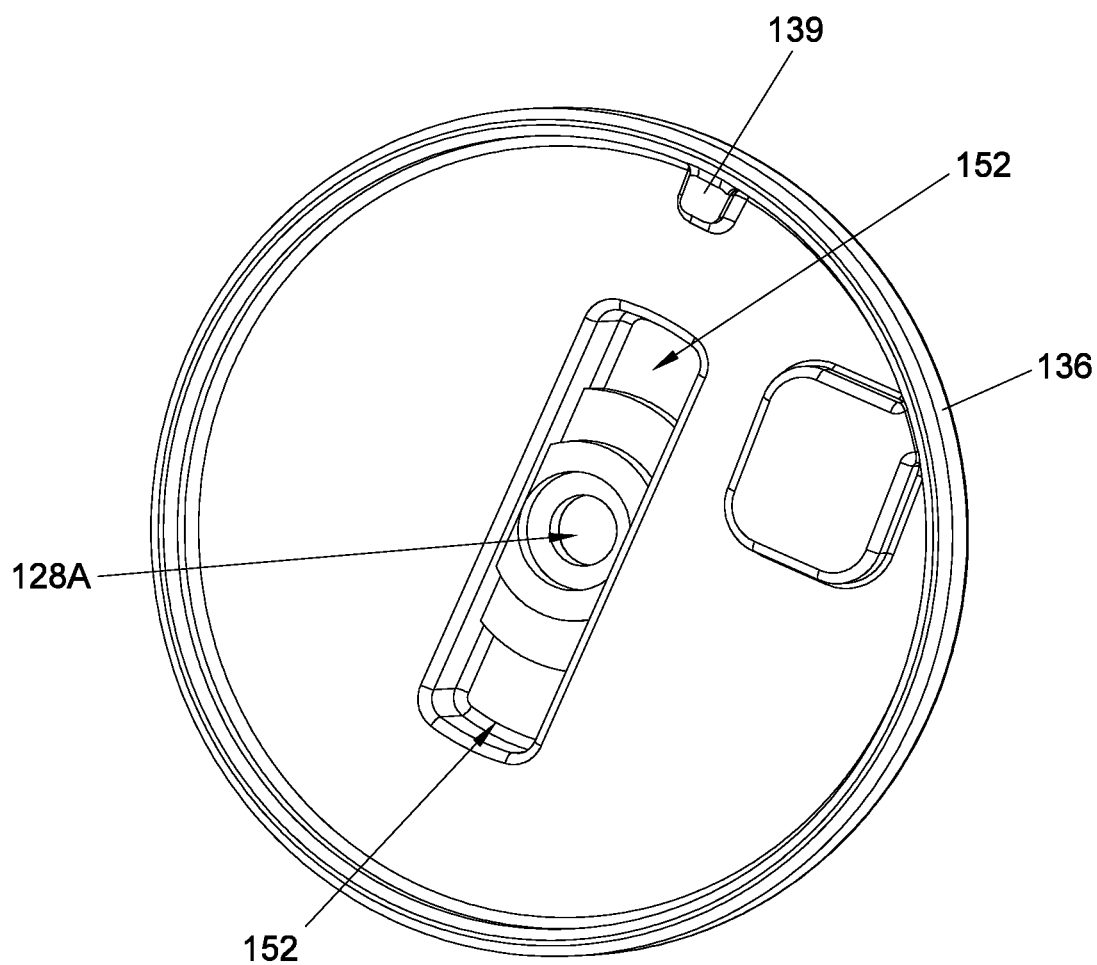
FIG. 8 is a perspective view illustrating some construction details of a coupling part that is fixedly connected with the front guard.

Referring to FIGS. 5-7, the spring 144 can be connected with the front guard latch 142, and is adapted to bias the front guard latch 142 toward the locking position. For example, the spring 144 may have two opposite ends respectively connected with the front guard latch 142 and the coupling part 128 of the front guard 106.

Referring to FIGS. 5, 7, 9 and 10, a release actuator 156 may be provided for facilitating unlocking of the front guard latch 142. The release actuator 156 is operable to cause the front guard latch 142 to move from the locking position to the unlocking position. More specifically, the release actuator 156 can be configured to contact and urge the front guard latch 142 to move from the locking position to the unlocking position as the handle frame 104 rotates relative to the standing frame 102 in a direction for folding the child stroller apparatus 100.

Figure 9:
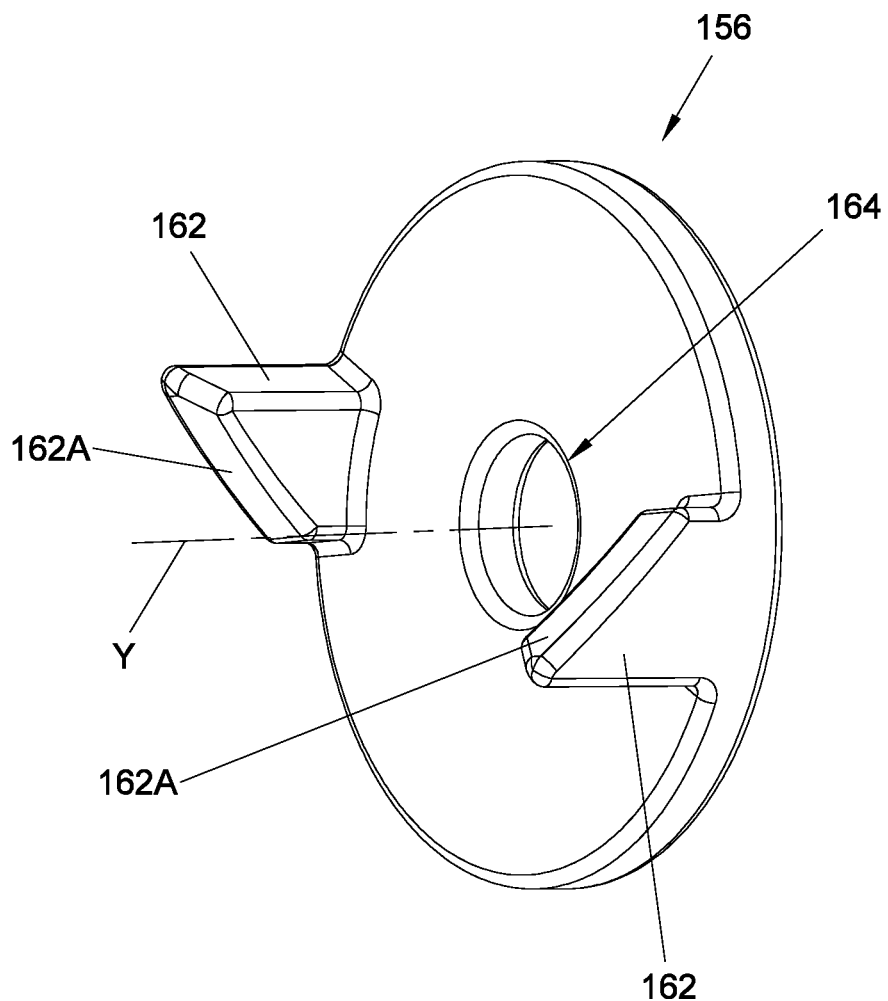
FIG. 9 is a perspective view illustrating a release actuator operable to urge a front guard latch of the locking mechanism to move from a locking position to an unlocking position.
Figure 10:
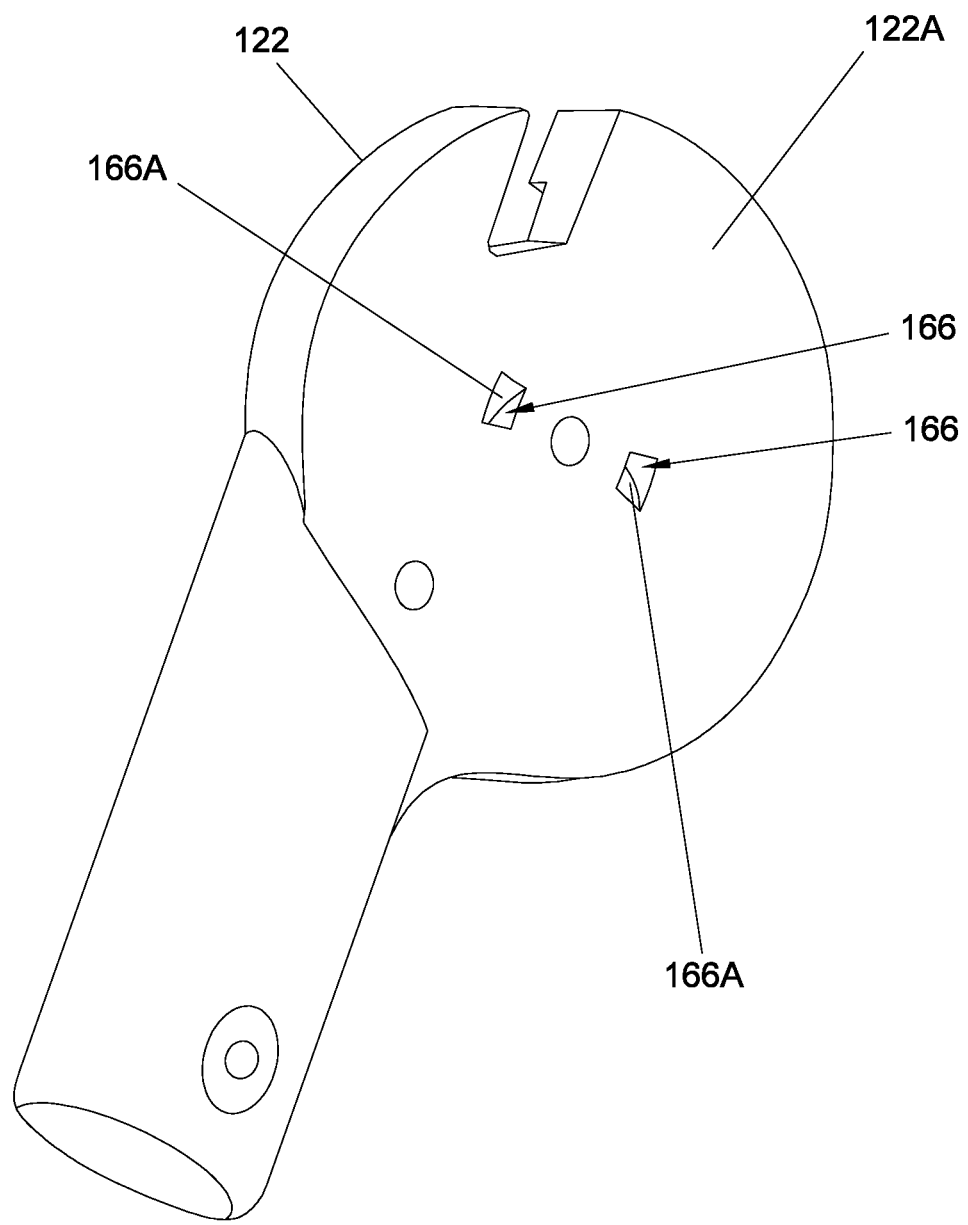
FIG. 10 is a perspective view illustrating some construction details of a coupling part that is fixedly connected with a leg frame of the child stroller apparatus.

Referring to FIGS. 7 and 9, the release actuator 156 can extend through the coupling part 120 of the handle frame 104, and can be connected with the coupling part 122 of the leg frame 108. For example, the coupling part 120 can have a hole 158 connected with the locking opening 148, and the release actuator 156 can be slidably connected with the coupling part 120 through the hole 158. According to an example of construction, the release actuator 156 can have a round shape including one or more protruding portion 162 provided at one side thereof, and a hole 164. The release actuator 156 including the protruding portion 162 may be formed integrally as a single part. The release actuator 156 can be at least partially received in the hole 158 with the shaft portion 126 disposed through the hole 164, the protruding portion 162 being radially distant from the pivot axis Y and slidably connected with the coupling part 120. Accordingly, the release actuator 156 is rotatable along with the coupling part 120 and the handle frame 104 about the pivot axis Y and is slidable relative to the coupling part 120 and the handle frame 104 along the pivot axis Y. Once assembled, the release actuator 156 may be connected with the coupling part 122 via a contact between the protruding portion 162 of the release actuator 156 and the coupling part 122.

As the handle frame 104 rotates in the direction for folding the child stroller apparatus 100, the coupling part 122 of the leg frame 108 can urge the release actuator 156 to move relative to the coupling part 120 so that the release actuator 156 contacts and urges the front guard latch 142 to move from the locking position to the unlocking position. For example, a surface 122A of the coupling part 122 oriented toward the release actuator 156 can include one or more groove 166 having a ramp surface 166A radially distant from the pivot axis Y that can come in sliding contact with the protruding portion 162 of the release actuator 156 for urging the release actuator 156 to push the front guard latch 142 from the locking position to the unlocking position. The protruding portion 162 of the release actuator 156 may also have a ramp surface 162A for facilitating its sliding contact with the ramp surface 164A on the coupling part 122.

Exemplary operation of the front guard 106 is described hereinafter with reference to FIGS. 1-10. While the child stroller apparatus 100 is in the unfolded state for use, the front guard 106 can be in the deployed configuration and can extend forward and above the seat support frame 113. The release actuator 156 can be positioned with the protruding portion 162 thereof at least partially received in the groove 164 of the coupling part 122, and the front guard latch 142 biased by the spring 144 can be in the locking position engaged with the locking opening 148 of the coupling part 120. The front guard 106 can be thereby rotationally locked to the handle frame 104 in the deployed configuration.

For folding the child stroller apparatus 100, the handle frame 104 and the coupling part 120 thereof can rotate about the pivot axis Y in a folding direction relative to the leg frame 108 and the coupling part 122 thereof. As the handle frame 104 rotates in the folding direction, the coupling part 122 can urge the release actuator 156 to move relative to the coupling part 120 along the pivot axis Y toward the front guard latch 142 owing to a sliding contact between the protruding portion 162 of the release actuator 156 and the ramp surface 164A of the groove 164. As a result, the release actuator 156 can contact and urge the front guard latch 142 to move against the biasing force of the spring 144 from the locking position to the unlocking position for disengaging from the locking opening 148 of the coupling part 120. The front guard 106 can be thereby unlocked, and can rotate about the pivot axis Y relative to the handle frame 104 toward the leg frame 108 under gravity action or another external force applied thereon. This rotation of the front guard 106 can be stopped by a contact between the stop protrusion 138 provided on the coupling part 120 of the handle frame 104 and the stop protrusion 139 provided on the coupling part 128 of the front guard 106. Once the handle frame 104 is fully folded, the protruding portion 162 of the release actuator 156 can be located adjacent to the surface 122A of the coupling part 122 and displaced away from the groove 164.

For unfolding the child stroller apparatus 100, the handle frame 104 can be rotated in a reverse direction. Once the child stroller apparatus 100 is in the unfolded state, the protruding portion 162 of the release actuator 156 can be located adjacent to the groove 164 on the coupling part 122 of the leg frame 108. The front guard 106 then can be rotated to the deployed configuration, and the front guard latch 142 can move from the unlocking position to the locking position engaged with the locking opening 148 under the biasing force of the spring 144.

Figure 11:
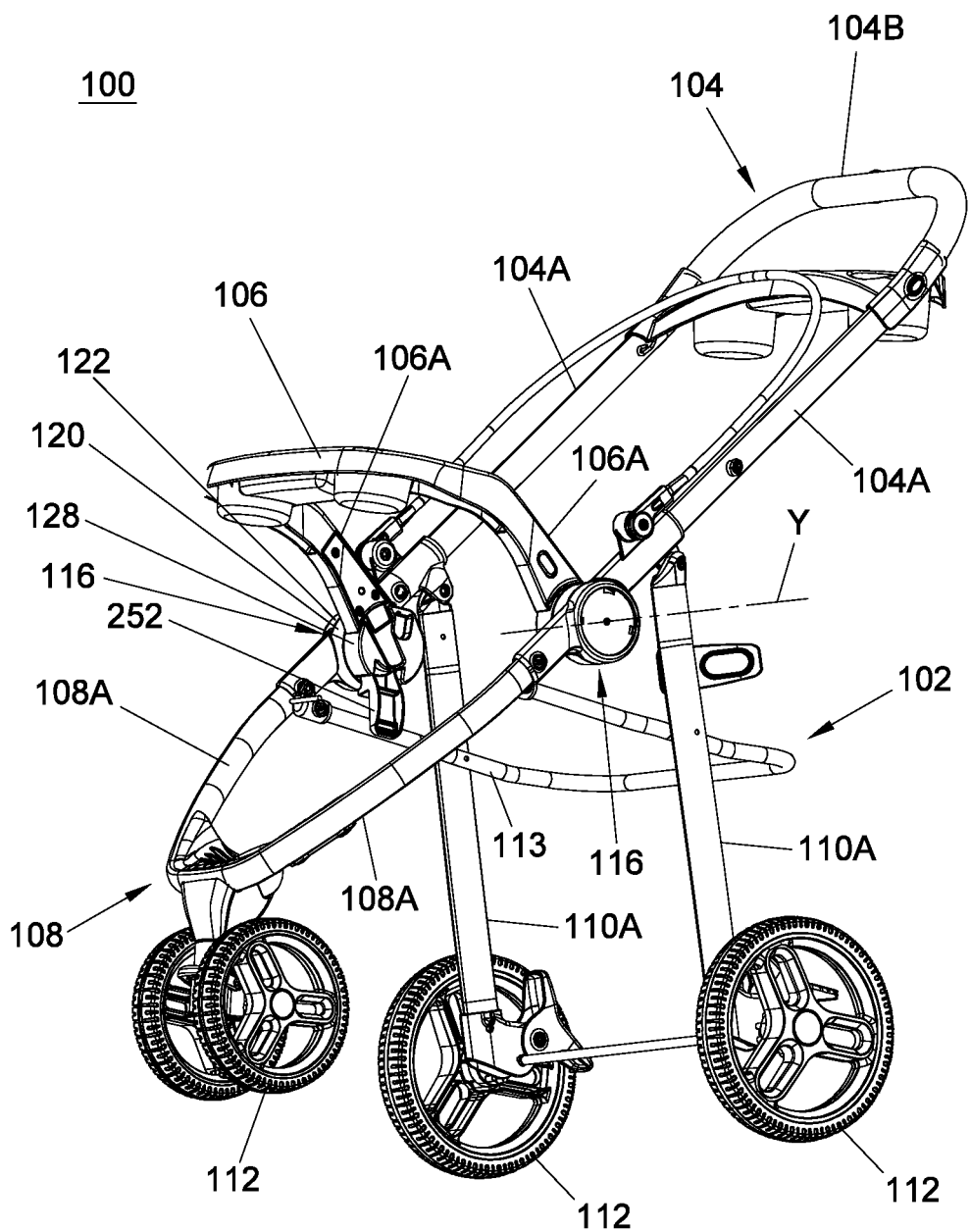
FIG. 11 is a perspective view illustrating the child stroller apparatus provided with another locking mechanism for holding the front guard in the deployed configuration.
Figure 12:
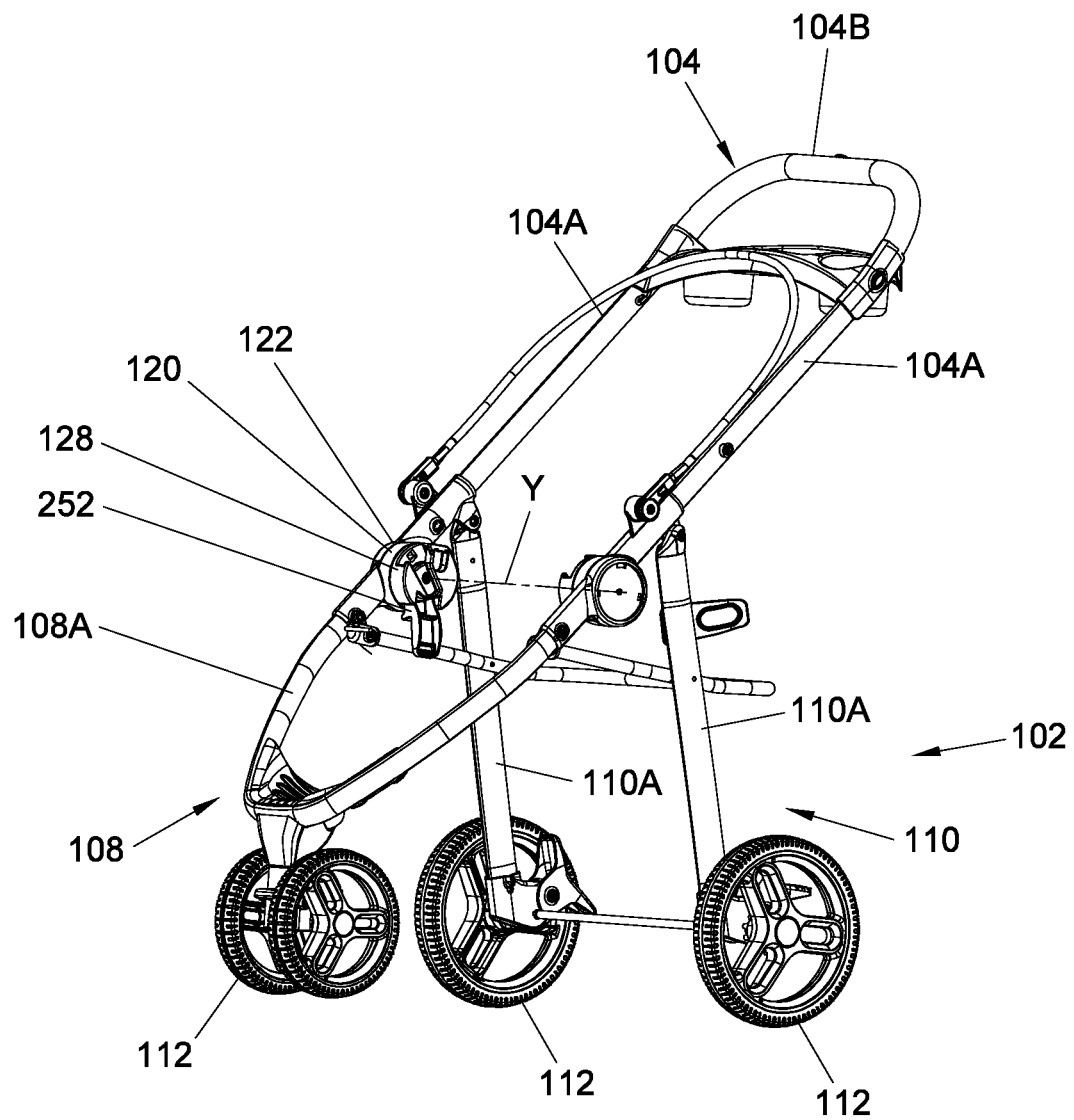
FIG. 12 is a perspective view illustrating the child stroller apparatus of FIG. 11 without the front guard.
Figure 13:
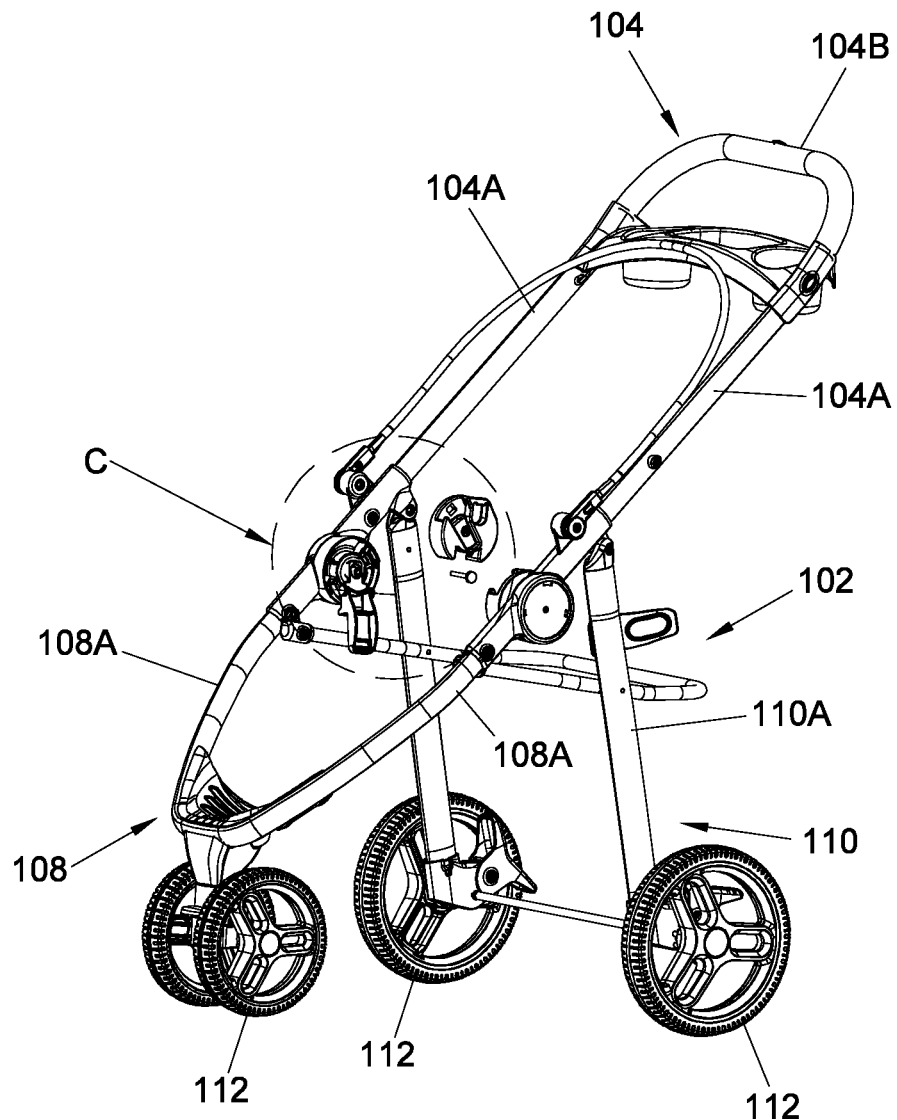
FIG. 13 is a partially exploded view illustrating some construction details of the locking mechanism provided in the child stroller apparatus of FIG. 11.
Figure 14:
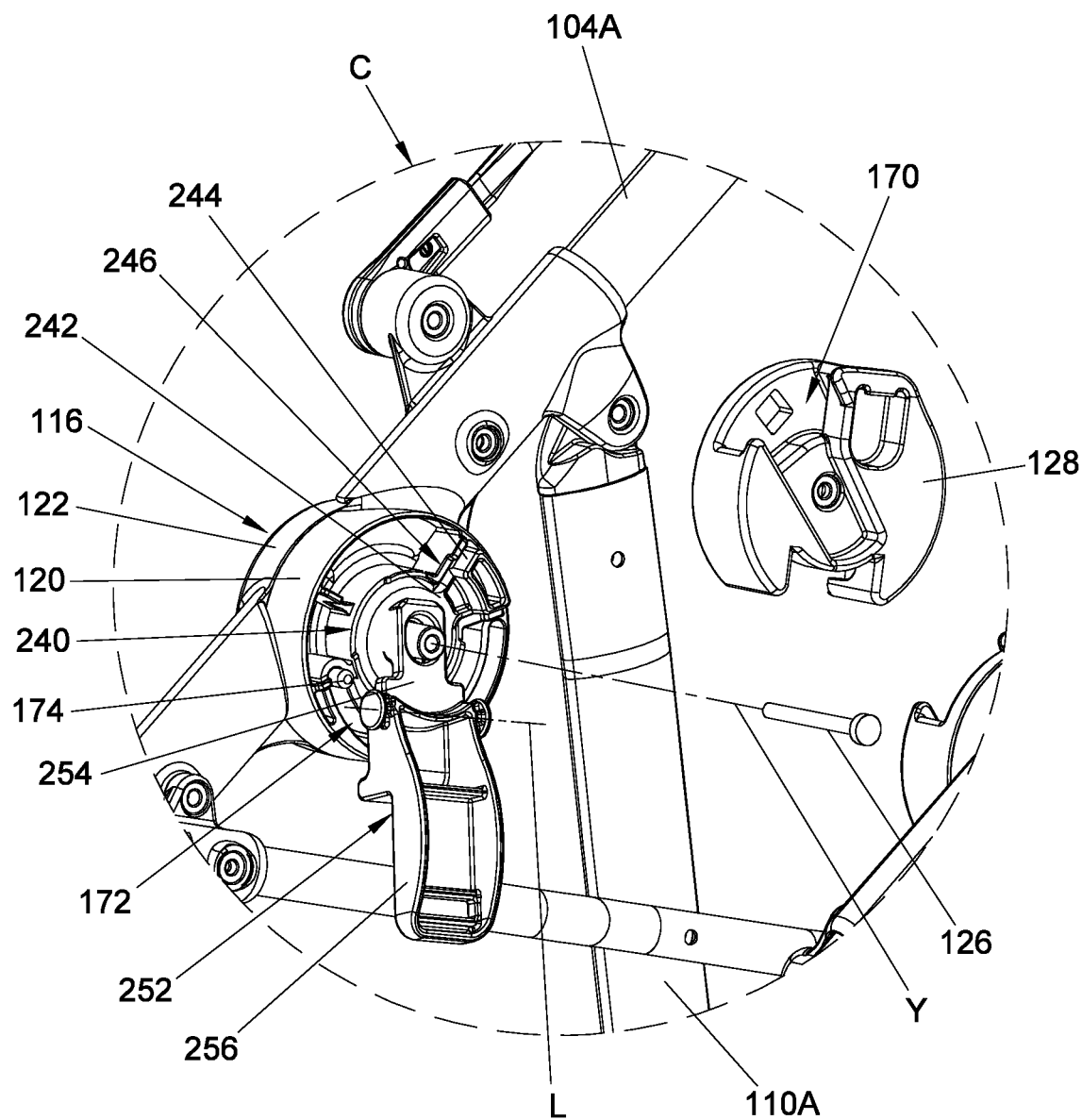
FIG. 14 is an enlarged view of portion C shown in FIG. 13.
Figure 15:
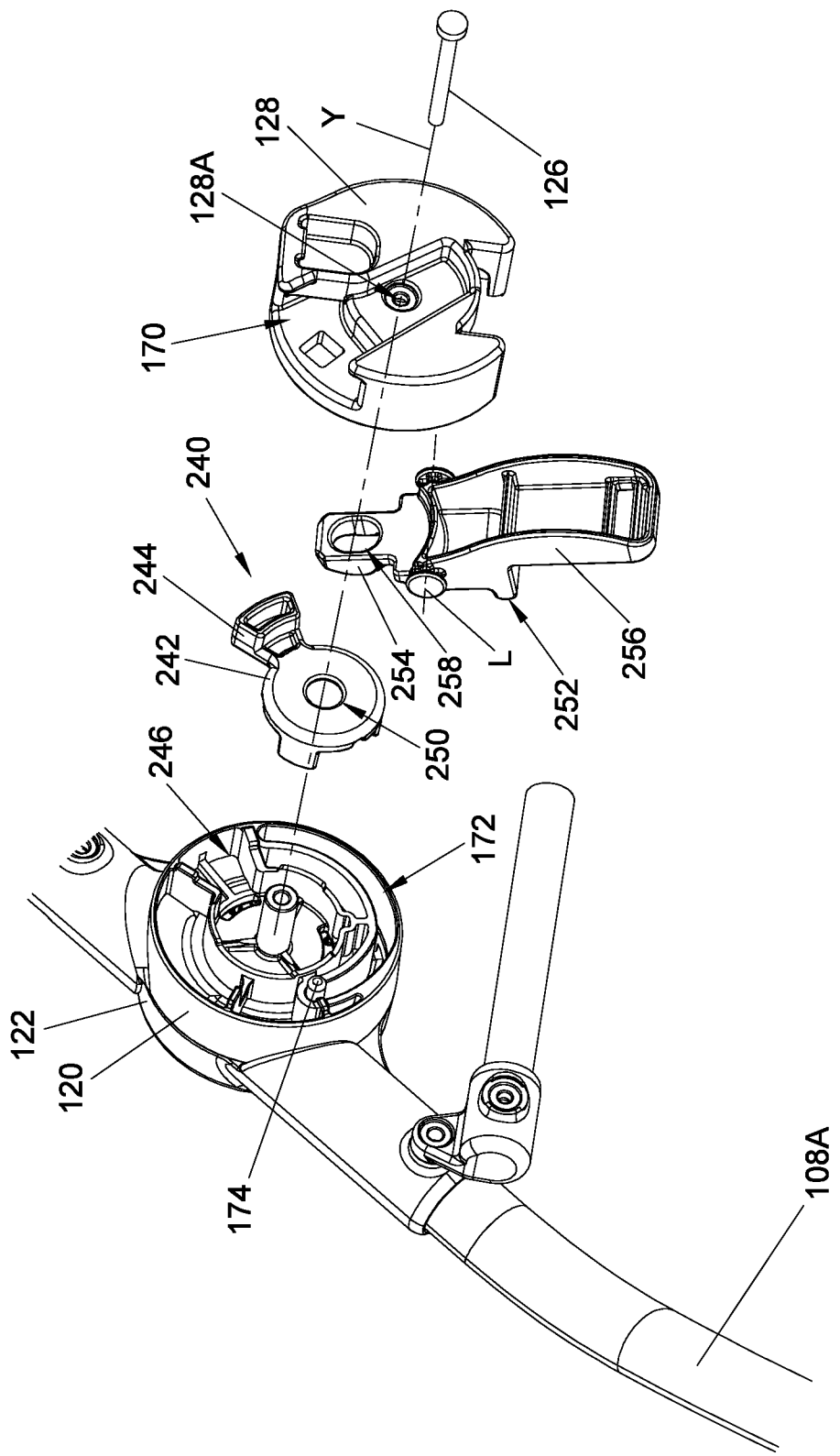
FIG. 15 is an enlarged view illustrating further construction details of the locking mechanism provided in the child stroller apparatus of FIG. 11.

FIGS. 11-13 are schematic views illustrating the child stroller apparatus 100 provided with another locking mechanism 240 for holding the front guard 106 in the deployed configuration, and FIGS. 14 and 15 are two enlarged views illustrating construction details of the locking mechanism 240. Referring to FIGS. 11-15, the child stroller apparatus 100 can likewise include the standing frame 102, the handle frame 104 pivotally coupled to the standing frame 102, and the front guard 106 pivotally coupled to the handle frame 104. At each of the left and right side, the joint structure 116 that pivotally connects the side segment 104A of the handle frame 104 with the side segment 108A of the leg frame 108 can likewise include the coupling part 120 fixedly connected with the side segment 104A of the handle frame 104, and the coupling part 122 fixedly connected with the side segment 108A of the leg frame 108. The coupling part 120 can be pivotally connected with the coupling part 122 about the pivot axis Y via the shaft portion 126, whereby the handle frame 104 can rotate about the pivot axis Y relative to the leg frame 108 for folding and unfolding the child stroller apparatus 100.

Referring to FIGS. 11-15, each side portion 106A of the front guard 106 can have the coupling part 128 that is pivotally connected with the coupling part 120 of the handle frame 104 about the pivot axis Y, wherein the coupling part 120 can be respectively connected pivotally with the coupling parts 122 and 128 at two opposite sides. The coupling part 128 may be attached to the corresponding side portion 106A of the front guard 106 by engaging a mount portion (not shown) provided on the front guard 106 with a slot 170 provided on the coupling part 128. In this manner, the handle frame 104, the front guard 106 and the leg frame 108 can rotate relative to one another about the pivot axis Y for folding and unfolding the child stroller apparatus 100.

Referring to FIGS. 14, 15, 18 and 19, the coupling part 120 of the handle frame 104 can have an arcuate slot 172 centered on the pivot axis Y, and the coupling part 122 of the leg frame 108 can be fixedly connected with a pin 174 that is slidably disposed through the arcuate slot 172. When the handle frame 104 rotates about the pivot axis Y relative to the leg frame 108, the pin 174 can travel along the arcuate slot 172, which can help to delimit a range of rotation of the handle frame 104 relative to the leg frame 108. Moreover, the pin 174 can further be slidably connected with a curved slot 176 provided in the coupling part 128 of the front guard 106, wherein the pin 174 can travel along the curved slot 176 during rotation of the front guard 106 relative to the handle frame 104. The curved slot 176 may include a restraining portion having a curvature that differs from that of the arcuate slot 172 and/or is not centered on the pivot axis Y. Accordingly, the restraining portion of the curved slot 176 can impede a movement of the pin 174, which can restrain the coupling part 128 and help holding the front guard 106 in position relative to the leg frame 108. During folding, the front guard 106 once unlocked can freely rotate until the pin 174 is caught in the restraining portion of the curved slot 176, whereby the front guard 106 can be held in a folded position relative to the leg frame 108.

It will be appreciated that the aforementioned features of the pin 174 and the curved slot 176 for holding the front guard 106 in the folded position may be applied separately and independently of the locking mechanism for holding the front guard 106 in the deployed configuration.

Referring to FIGS. 11-15, the locking mechanism 240 can include a front guard latch 242 disposed adjacent to the coupling parts 120 and 128. According to an example of construction, the front guard latch 242 can be carried and connected with the coupling part 120 of the handle frame 104. The front guard latch 242 can move relative to the coupling parts 120 and 128 between a locking position where the front guard latch 242 is engaged with the coupling parts 120 and 128 so that the front guard 106 is locked to the handle frame 104 in the deployed configuration, and an unlocking position where the front guard latch 242 is disengaged from the coupling part 128 for rotation of the front guard 106 relative to the standing frame 102 and the handle frame 104. For example, the front guard latch 242 can have a latching portion 244 radially distant from the pivot axis Y that is received at least partially in a cavity 246 in the coupling part 120 and can engage or disengage a locking opening 248 (better shown in FIG. 18) provided in the coupling part 128 for rotationally locking or unlocking the front guard 106 with respect to the handle frame 104. The front guard latch 242 including the latching portion 244 may be formed integrally as a single part. The latching portion 244 can be engaged with the locking opening 248 in the locking position, and disengaged from the locking opening 248 in the unlocking position.

According to an example of construction, the front guard latch 242 can be disposed in a cavity delimited at least partially by the coupling parts 120 and 128, and can be mounted for sliding between the locking position and the unlocking position. For example, the front guard latch 242 can have an opening 250 through which is disposed the shaft portion 126, whereby the front guard latch 242 can slide along the pivot axis Y between the locking position and the unlocking position.

Referring to FIGS. 11-15, a release actuator 252 may be provided for facilitating unlocking of the front guard latch 242. The release actuator 252 is operable to contact and urge the front guard latch 242 to move from the locking position to the unlocking position. For example, the release actuator 252 can be carried with the coupling part 128, and is movable to contact and urge the front guard latch 242 to move from the locking position to the unlocking position.

According to an example of construction, the release actuator 252 can be pivotally connected with the coupling part 128 about a pivot axis L, and can include an actuation portion 254 and a pulling portion 256. The release actuator 252 including the actuation portion 254 and the pulling portion 256 can be formed integrally as a single part. The release actuator 252 can be pivotally connected with the coupling part 128 at a location between the actuation portion 254 and the pulling portion 256, the actuation portion 254 being disposed adjacent to the front guard latch 242 inside the cavity between the coupling parts 120 and 128, and the pulling portion 256 extending outward. For a compact assembly, the actuation portion 254 may have an opening 258 for the passage of the shaft portion 126. The release actuator 252 can thereby rotate relative to the coupling part 128 to urge the actuation portion 254 to contact the front guard latch 242 and thereby urge the front guard latch 242 to move from the locking position to the unlocking position. For facilitating the operation of the release actuator 252, the pulling portion 256 of the release actuator 252 may be connected with a strap (not shown) which can be pulled upward by a caregiver to cause rotation of the release actuator 252.

Referring to FIGS. 11-20, a locking mechanism 260 can be provided for holding the child stroller apparatus 100 in the unfolded state. The locking mechanism 260 can include a frame latch 262 disposed adjacent to the coupling part 120 of the handle frame 104 and the coupling part 122 of the leg frame 108. The frame latch 262 is movable between a locking state where the frame latch 262 is engaged with the coupling parts 120 and 122 to rotationally lock the handle frame 104 with respect to the leg frame 108 and thereby lock the child stroller apparatus 100 in the unfolded state, and an unlocking state where the frame latch 262 is disengaged from one of the coupling parts 120 and 122 for rotation of the handle frame 104 relative to the leg frame 108.

According to an example of construction, the frame latch 262 can be carried and connected with the coupling part 122, and can move to engage with the coupling part 120 for rotationally locking the handle frame 104 in the unfolded state or disengage from the coupling part 120 for rotation of the handle frame 104. For example, the frame latch 262 can be at least partially received in a cavity 264 in the coupling part 122, and can have a hole 266 through which is disposed the shaft portion 126. The frame latch 262 can thereby slide along the pivot axis Y between the locking state and the unlocking state. According to an example of construction, the frame latch 262 can have one or more protruding tooth 268, and is movable to cause the protruding tooth 268 to engage or disengage the coupling part 120. For example, the protruding tooth 268 of the frame latch 262 can be engaged with one or more corresponding notch 270 in the coupling part 122 and one or more corresponding notch 272 in the coupling part 120 in the locking state, and can be disengaged from the notch 272 of the coupling part 120 in the unlocking state.

Figure 16:
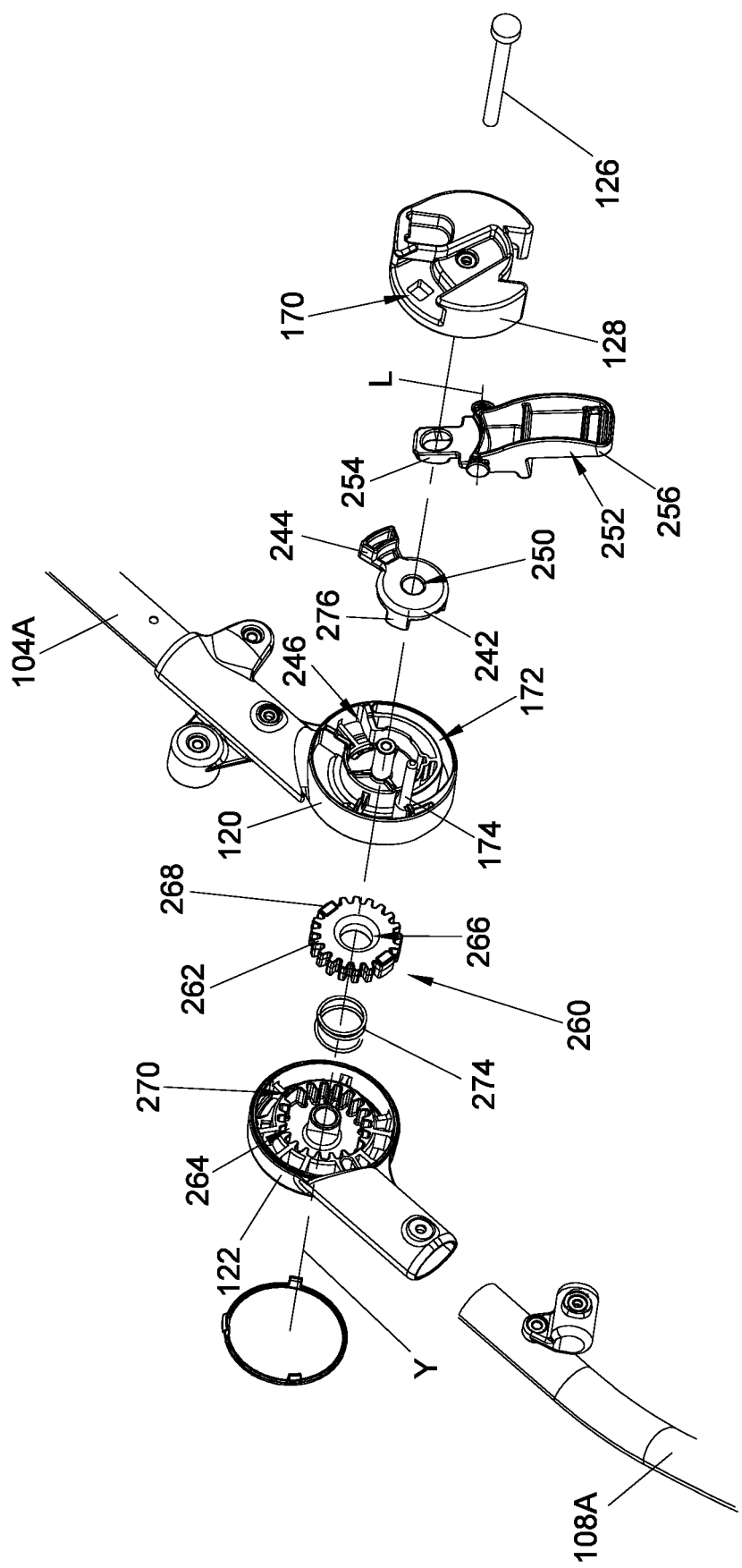
FIG. 16 is an exploded view illustrating construction details of the locking mechanism for holding the front guard in the deployed configuration and construction details of a locking mechanism for holding the handle frame in an unfolded state in the child stroller apparatus of FIG. 11.

Referring to FIG. 16, the locking mechanism 260 can further include a spring 274 that is respectively connected with the frame latch 262 and an inner sidewall of the coupling part 122. The spring 274 can bias the frame latch 262 toward the locking state.

Figure 17:
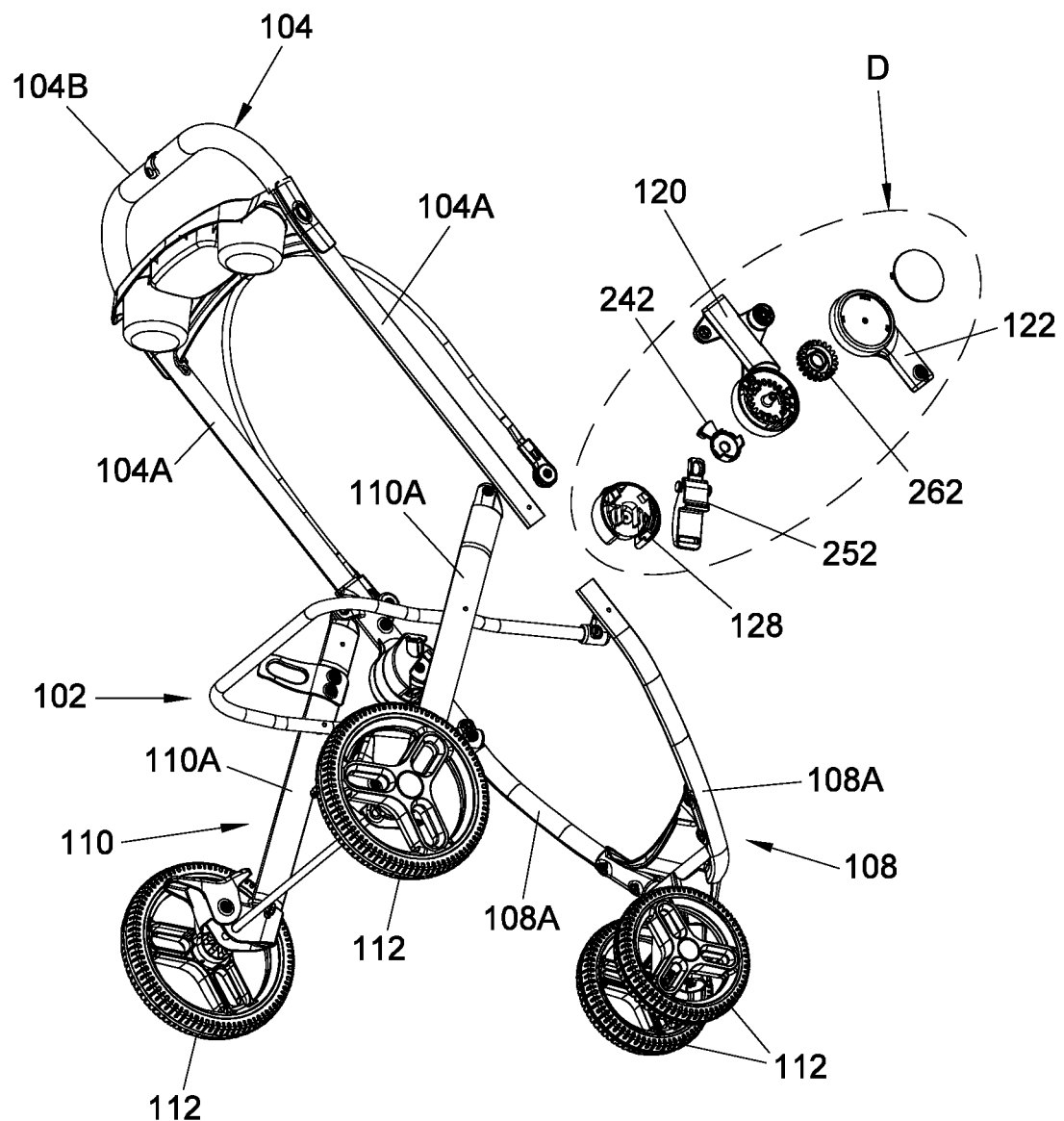
FIG. 17 is another exploded view illustrating the locking mechanism for holding the front guard in the deployed configuration and the locking mechanism for holding the handle frame in the unfolded state in the child stroller apparatus of FIG. 11.
Figure 18:
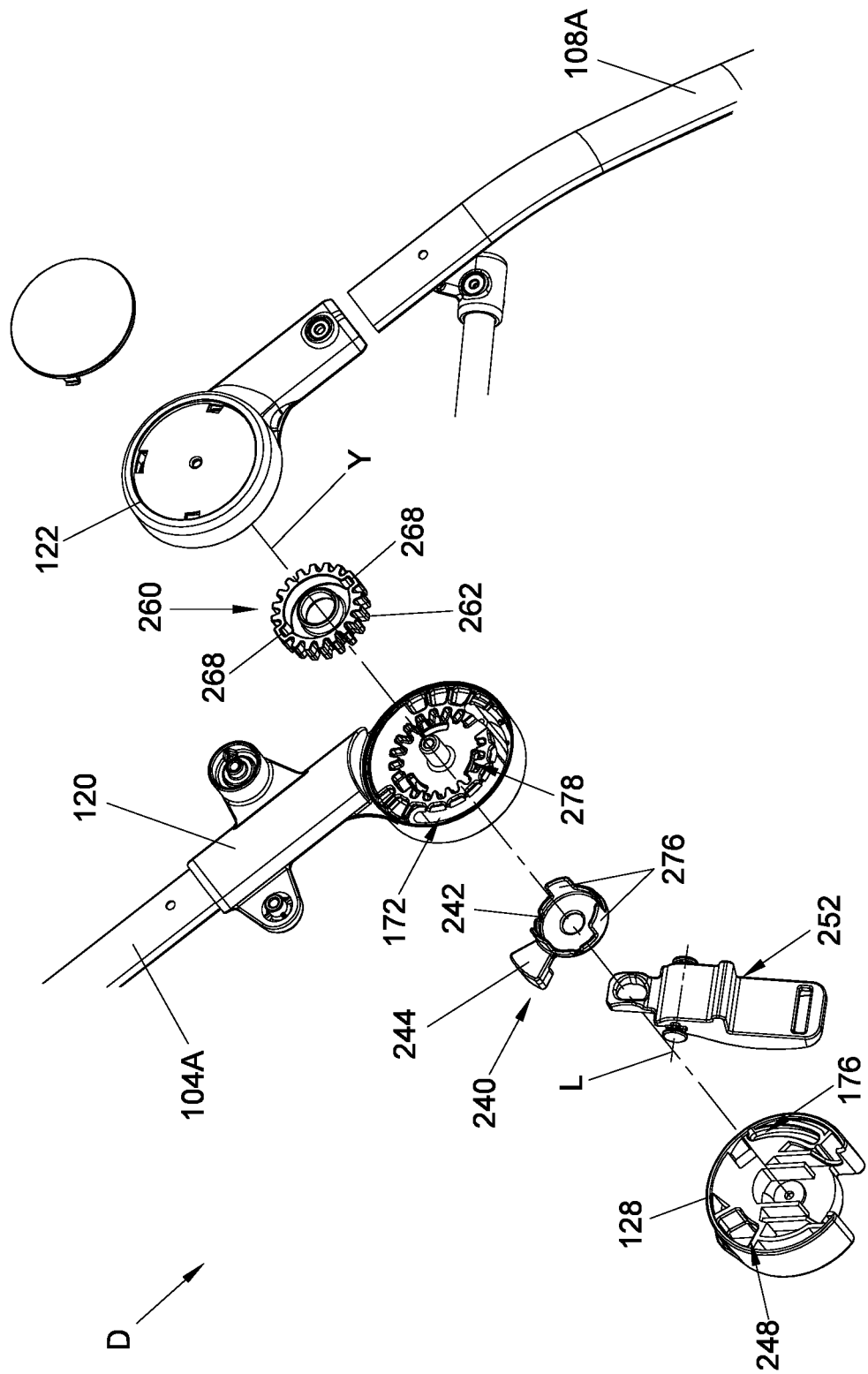
FIG. 18 is an enlarged view of portion D shown in FIG. 17.
Figure 19:
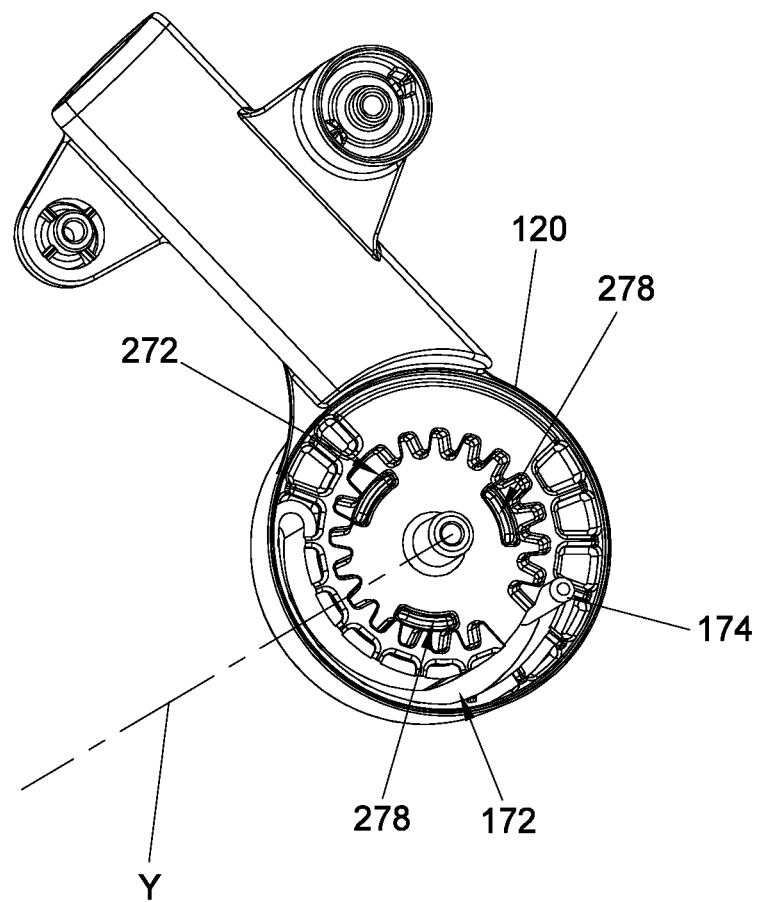
FIG. 19 is a perspective view illustrating some construction details of a coupling part that is fixedly connected with the handle frame in the child stroller apparatus of FIG. 11.
Figure 20:
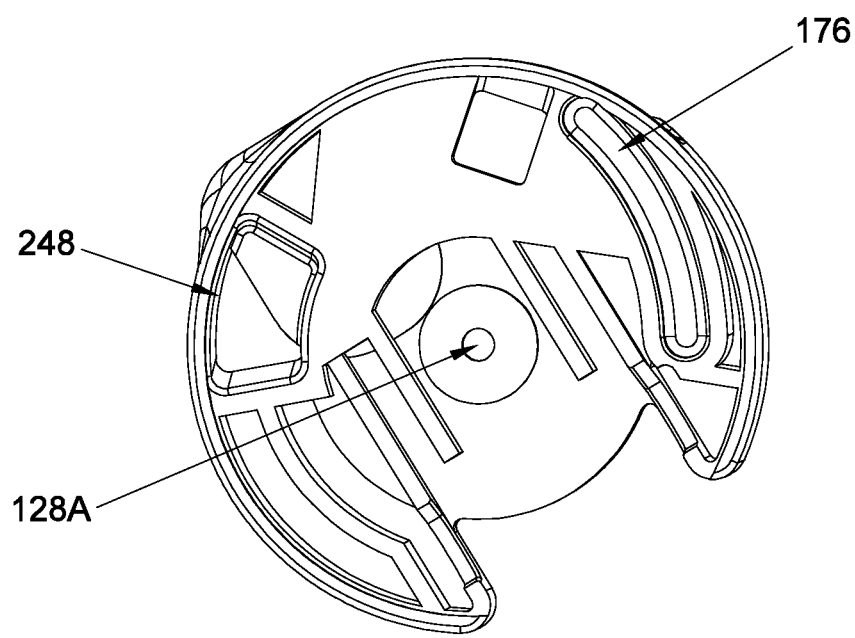
FIG. 20 is a perspective view illustrating some construction details of a coupling part that is fixedly connected with the front guard in the child stroller apparatus of FIG. 11.

Referring to FIGS. 16-18, the frame latch 262 and the front guard latch 242 can be linked in movement during operation. According to an example of construction, the front guard latch 242 and the frame latch 262 can slide along the pivot axis Y in contact with each other. For example, the front guard latch 242 can have one or more protruding rib 276 projecting at a side opposite to that of the latching portion 244 that can extend through the coupling part 120 for contacting with the frame latch 262. For facilitating the passage of the protruding rib 276, the coupling part 120 can have one or more slot 278. With this construction, the release actuator 252 is operable to cause the front guard latch 242 and the frame latch 262 to move concurrently in the same unlocking direction for rotationally unlocking the front guard 106 and the handle frame 104. Moreover, the biasing force of the spring 274 can urge the frame latch 262 and the front guard latch 242 to move concurrently in the same locking direction for rotationally locking the handle frame 104 and the front guard 106.

Exemplary operation of the locking mechanisms 240 and 260 is described hereinafter with reference to FIGS. 11-20. While the child stroller apparatus 100 is in the unfolded state for use, the front guard 106 can be in the deployed configuration and can extend forward and above the seat support frame 113. The biasing force applied by the spring 274 can keep the frame latch 262 in the locking state for rotationally locking the handle frame 104 in the unfolded state. While the the child stroller apparatus 100 is in the unfolded state and the front guard 106 in the deployed configuration, the protruding rib 276 of the front guard latch 242 can extend through the slot 278 in the coupling part 120 and contact the frame latch 262. Owing to the contact between the frame latch 262 and the front guard latch 242, the biasing force of the spring 274 can assist in keeping the front guard latch 242 in the locking position for rotationally locking the front guard 106 to the handle frame 104 in the deployed configuration.

For folding the child stroller apparatus 100, the release actuator 252 can be operated to urge the front guard latch 242 to move from the locking position to the unlocking position. As the front guard latch 242 moves toward the unlocking position, the front guard latch 242 can contact and urge the frame latch 262 to move against the biasing force of the spring 274 from the locking state to the unlocking state. As a result, the handle frame 104 and the front guard 106 can be concurrently unlocked for folding. The handle frame 104 and the front guard 106 then can respectively rotate and fold toward the leg frame 108, wherein the release actuator 252 carried with the coupling part 128 can move along with the front guard 106. The front guard 106 can rotate until the pin 174 is caught in the restraining portion of the curved slot 176, whereby the front guard 106 can be held in a folded position relative to the leg frame 108.

For deploying the child stroller apparatus 100, the handle frame 104 can be rotated in a reverse direction until it is fully unfolded. Then the front guard 106 can rotated to the deployed configuration. Once the child stroller apparatus 100 is in the unfolded state with the front guard 106 in the deployed configuration, the spring 274 can urge the frame latch 262 and the front guard latch 242 to move in contact with each other in the locking direction. The handle frame 104 and the front guard 106 can be thereby locked in a concurrent manner.

The aforementioned embodiment provides a construction in which the release actuator 252 and the spring 274 can respectively apply opposing forces on the front guard latch 242 and the frame latch 262 during operation. According to a variant construction, the positions of the release actuator 252 and the spring 274 may be interchanged so that the release actuator 252 and the spring 274 can respectively apply opposing forces on the frame latch 262 and the front guard latch 242. In this variant construction, the spring 274 may be connected with the front guard latch 242 and the coupling part 128 of the front guard 106, and the release actuator 252 may be carried with the coupling part 122 of the leg frame 108, wherein the biasing force of the spring 274 can urge the front guard latch 242 and the frame latch 262 to respectively engage with the coupling parts 120 and 122 for rotationally locking the front guard 106 and the handle frame 104, and the release actuator 252 is operable to contact and push against the frame latch 262 so that the frame latch 262 and the front guard latch 242 are urged in movement to respectively disengage from the coupling parts 122 and 120 for rotationally unlocking the handle frame 104 and the front guard 106.

Advantages of the child stroller apparatus described herein include the ability to fold a front guard with reduced effort, so that the child stroller apparatus can be generally more compact in the folded state. Storage and transport of the child stroller apparatus thus can be facilitated.

Realizations of the child stroller apparatuses have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child stroller apparatus comprising:
    a standing frame;
    a handle frame pivotally coupled to the standing frame and having a first coupling part, the handle frame being rotatable relative to the standing frame for folding and unfolding the child stroller apparatus;
    a front guard having a second coupling part pivotally connected with the first coupling part, the front guard being positionable in a deployed configuration while the child stroller apparatus is in an unfolded state; and
    a locking mechanism including a front guard latch disposed adjacent to the first and second coupling parts, the front guard latch being movable between a locking position where the front guard latch is engaged with the first and second coupling parts so that the front guard is locked to the handle frame in the deployed configuration, and an unlocking position where the front guard latch is disengaged from one of the first and second coupling parts for rotation of the front guard relative to the handle frame and the standing frame;

wherein the standing frame includes a leg frame having a third coupling part, the first coupling part being coaxially connected pivotally with the second coupling part and the third coupling part about a shaft portion so that the handle frame, the front guard and the leg frame are rotatable relative to one another about a same pivot axis for folding and unfolding the child stroller apparatus, and the front guard latch has an opening through which is disposed the shaft portion so that the front guard latch is slidable along the shaft portion between the locking position and the unlocking position.

2. The child stroller apparatus according to claim 1, wherein the locking mechanism further includes a spring connected with the front guard latch, the spring biasing the front guard latch toward the locking position.

3. The child stroller apparatus according to claim 1, wherein the first coupling part is pivotally connected with the second coupling part at a first side and pivotally connected with the third coupling part at a second side opposite to the first side.

4. The child stroller apparatus according to claim 3, further including a frame latch disposed adjacent to the first and third coupling parts, the frame latch being movable between a locking state where the frame latch is engaged with the first and third coupling parts for locking the child stroller apparatus in the unfolded state, and an unlocking state where the frame latch is disengaged from one of the first and third coupling parts for rotation of the handle frame relative to the leg frame, the frame latch and the front guard latch being linked in movement.

5. The child stroller apparatus according to claim 4, wherein the front guard latch and the frame latch are slidable along the pivot axis in contact with each other.

6. The child stroller apparatus according to claim 4, further including a spring configured to apply a biasing force that urges the frame latch and the front guard latch to move concurrently in a locking direction for rotationally locking the handle frame and the front guard.

7. The child stroller apparatus according to claim 4, further including a release actuator operable to cause the front guard latch and the frame latch to move concurrently in an unlocking direction.

8. The child stroller apparatus according to claim 7, wherein the release actuator is carried with the second coupling part and is movable to contact and urge the front guard latch to move from the locking position to the unlocking position, the movement of the front guard latch toward the unlocking position causing the front guard latch to contact and urge the frame latch to move from the locking state to the unlocking state.

9. The child stroller apparatus according to claim 7, wherein the release actuator is carried with the third coupling part and is operable to contact and push against the frame latch so that the frame latch and the front guard latch are urged in movement to respectively disengage from the third coupling part and the first coupling part.

10. The child stroller apparatus according to claim 3, wherein the second coupling part includes a curved slot having a restraining portion, and the third coupling part is fixedly connected with a pin that is slidably connected with the curved slot, the restraining portion being configured to catch the pin for holding the front guard in a folded position relative to the leg frame.

11. The child stroller apparatus according to claim 10, wherein the restraining portion of the curved slot has a curvature that is not centered on the pivot axis.

12. The child stroller apparatus according to claim 1, further including a release actuator operable to cause the front guard latch to move from the locking position to the unlocking position.

13. The child stroller apparatus according to claim 12, wherein the release actuator is operable to contact and urge the front guard latch to move from the locking position to the unlocking position as the handle frame rotates relative to the standing frame in a direction for folding the child stroller apparatus.

14. The child stroller apparatus according to claim 13, wherein the third coupling part is pivotally connected with the first coupling part at a side opposite to that of the second coupling part, and the release actuator is connected with the third coupling part.

15. The child stroller apparatus according to claim 13, wherein the release actuator extends through the first coupling part, and the third coupling part is pivotally connected with the first coupling part at a side opposite to that of the second coupling part, the third coupling part urging the release actuator to move relative to the first coupling part and push the front guard latch to move from the locking position to the unlocking position as the handle frame rotates in the direction for folding the child stroller apparatus.

16. The child stroller apparatus according to claim 15, wherein the release actuator is slidably connected with the first coupling part, the release actuator being urged in movement relative to the first coupling part for causing the front guard latch to move from the locking position to the unlocking position via a sliding contact between the release actuator and the third coupling part.

17. The child stroller apparatus according to claim 16, wherein the release actuator has a protruding portion radially distant from the pivot axis that is slidably connected with the first coupling part, whereby the release actuator is rotatable along with the first coupling part about the pivot axis and is slidable relative to the first coupling part along the pivot axis.

18. The child stroller apparatus according to claim 17, wherein the release actuator is urged in movement relative to the first coupling part for causing the front guard latch to move from the locking position to the unlocking position via a sliding contact between the protruding portion of the release actuator and the third coupling part.

19. The child stroller apparatus according to claim 12, wherein the release actuator is connected with the second coupling part, and is movable to contact and urge the front guard latch to move from the locking position to the unlocking position.

20. The child stroller apparatus according to claim 19, wherein the release actuator is pivotally connected with the second coupling part, the release actuator having an actuation portion disposed inside a cavity between the first and second coupling part and a pulling portion extending outward, the pulling portion being pullable to cause the release actuator to rotate for contacting and urging the front guard latch to move from the locking position to the unlocking position.

21. A child stroller apparatus comprising:
a standing frame;
a handle frame pivotally coupled to the standing frame and having a first coupling part, the handle frame being rotatable relative to the standing frame for folding and unfolding the child stroller apparatus;

a front guard having a second coupling part pivotally connected with the first coupling part, the front guard being positionable in a deployed configuration while the child stroller apparatus is in an unfolded state;

a locking mechanism including a front guard latch disposed adjacent to the first and second coupling parts, the front guard latch being movable between a locking position where the front guard latch is engaged with the first and second coupling parts so that the front guard is locked to the handle frame in the deployed configuration, and an unlocking position where the front guard latch is disengaged from one of the first and second coupling parts for rotation of the front guard relative to the handle frame and the standing frame; and a release actuator operable to cause the front guard latch to move from the locking position to the unlocking position, wherein the release actuator is pivotally connected with the second coupling part, the release actuator having an actuation portion disposed inside a cavity between the first and second coupling part and a pulling portion extending outward, the pulling portion being pullable to cause the release actuator to rotate for contacting and urging the front guard latch to move from the locking position to the unlocking position.

22. A child stroller apparatus comprising:

a standing frame;

a handle frame pivotally coupled to the standing frame and having a first coupling part, the handle frame being rotatable relative to the standing frame for folding and unfolding the child stroller apparatus;

a front guard having a second coupling part pivotally connected with the first coupling part, the front guard being positionable in a deployed configuration while the child stroller apparatus is in an unfolded state;

a locking mechanism including a front guard latch disposed adjacent to the first and second coupling parts, the front guard latch being movable between a locking position where the front guard latch is engaged with the first and second coupling parts so that the front guard is locked to the handle frame in the deployed configuration, and an unlocking position where the front guard latch is disengaged from one of the first and second coupling parts for rotation of the front guard relative to the handle frame and the standing frame; and a frame latch for locking the child stroller apparatus in the unfolded state;

wherein the standing frame includes a leg frame having a third coupling part, the first coupling part being pivotally connected with the second coupling part at a first side and pivotally connected with the third coupling part at a second side opposite to the first side, whereby the handle frame, the front guard and the leg frame are rotatable relative to one another for folding and unfolding the child stroller apparatus; and wherein the frame latch is disposed adjacent to the first and third coupling parts, the frame latch being movable between a locking state where the frame latch is engaged with the first and third coupling parts for locking the child stroller apparatus in the unfolded state, and an unlocking state where the frame latch is disengaged from one of the first and third coupling parts for rotation of the handle frame relative to the leg frame, the frame latch and the front guard latch being linked in movement.

23. The child stroller apparatus according to claim 22, wherein the second coupling part and the third coupling part are respectively connected pivotally with the first coupling part about a same pivot axis, the front guard latch and the frame latch being slidable along the pivot axis in contact with each other.

24. The child stroller apparatus according to claim 22, further including a spring configured to apply a biasing force that urges the frame latch and the front guard latch to move concurrently in a locking direction for rotationally locking the handle frame and the front guard.

25. The child stroller apparatus according to claim 22, further including a release actuator operable to cause the front guard latch and the frame latch to move concurrently in an unlocking direction.

26. The child stroller apparatus according to claim 25, wherein the release actuator is carried with the second coupling part and is movable to contact and urge the front guard latch to move from the locking position to the unlocking position, the movement of the front guard latch toward the unlocking position causing the front guard latch to contact and urge the frame latch to move from the locking state to the unlocking state.

27. The child stroller apparatus according to claim 25, wherein the release actuator is carried with the third coupling part and is operable to contact and push against the frame latch so that the frame latch and the front guard latch are urged in movement to respectively disengage from the third coupling part and the first coupling part.

28. A child stroller apparatus comprising:

a standing frame;

a handle frame pivotally coupled to the standing frame and having a first coupling part, the handle frame being rotatable relative to the standing frame for folding and unfolding the child stroller apparatus;

a front guard having a second coupling part pivotally connected with the first coupling part, the front guard being positionable in a deployed configuration while the child stroller apparatus is in an unfolded state; and a locking mechanism including a front guard latch disposed adjacent to the first and second coupling parts, the front guard latch being movable between a locking position where the front guard latch is engaged with the first and second coupling parts so that the front guard is locked to the handle frame in the deployed configuration, and an unlocking position where the front guard latch is disengaged from one of the first and second coupling parts for rotation of the front guard relative to the handle frame and the standing frame;

wherein the standing frame includes a leg frame having a third coupling part, the first coupling part being pivotally connected about a same pivot axis with the second coupling part at a first side and with the third coupling part at a second side opposite to the first side so that the handle frame, the front guard and the leg frame are rotatable relative to one another for folding and unfolding the child stroller apparatus; and wherein the second coupling part includes a curved slot having a restraining portion, and the third coupling part is fixedly connected with a pin that is slidably connected with the curved slot, the restraining portion being configured to catch the pin for holding the front guard in a folded position relative to the leg frame.

29. The child stroller apparatus according to claim 28, wherein the restraining portion of the curved slot has a curvature that is not centered on the pivot axis.

* * * * *